(12) United States Patent
Demura

(10) Patent No.: US 7,813,866 B2
(45) Date of Patent: Oct. 12, 2010

(54) FUEL INJECTION CONTROL DEVICE OF INTERNAL COMBUSTION ENGINE

(75) Inventor: Takayuki Demura, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 163 days.

(21) Appl. No.: 12/298,070

(22) PCT Filed: Sep. 21, 2007

(86) PCT No.: PCT/IB2007/002735

§ 371 (c)(1),
(2), (4) Date: Oct. 22, 2008

(87) PCT Pub. No.: WO2008/035190

PCT Pub. Date: Mar. 27, 2008

(65) Prior Publication Data

US 2009/0099756 A1    Apr. 16, 2009

(30) Foreign Application Priority Data

Sep. 22, 2006    (JP) .............................. 2006-257238

(51) Int. Cl.
 F02D 41/00        (2006.01)
 F02M 51/00        (2006.01)
 G06F 19/00        (2006.01)
(52) U.S. Cl. ...................................... 701/103; 123/491
(58) Field of Classification Search ......... 701/101–105, 701/113, 115; 123/295, 305, 491, 179.4, 123/179.17
See application file for complete search history.

(56) References Cited

U.S. PATENT DOCUMENTS 7,406,942 B2 * 8/2008 Ashizawa et al. .......... 123/295

7,599,787 B2 * 10/2009 Hokuto et al. .............. 701/113
2006/0005812 A1  1/2006 Mashiki
2006/0016431 A1  1/2006 Mashiki et al.
2006/0096572 A1  5/2006 Satou et al.
2006/0096576 A1  5/2006 Kinose

FOREIGN PATENT DOCUMENTS

| JP | 3 286123 | 12/1991 |
|---|---|---|
| JP | 5 248277 | 9/1993 |
| JP | 11 210548 | 8/1999 |
| JP | 2000 192841 | 7/2000 |
| JP | 2000 274278 | 10/2000 |
| JP | 2000 303894 | 10/2000 |
| JP | 2001 98973 | 4/2001 |
| JP | 2002 327646 | 11/2002 |
| JP | 2003 222042 | 8/2003 |
| JP | 2004 324479 | 11/2004 |
| JP | 2006 9619 | 1/2006 |
| JP | 2006-274949 A * | 10/2006 |

* cited by examiner

Primary Examiner—Hieu T Vo
(74) Attorney, Agent, or Firm—Oblon, Spivak, McClelland, Maier & Neustadt, L.L.P.

(57) ABSTRACT

An internal combustion engine including an in-cylinder injection injector and an intake port-injection injector. An ECU includes a fuel injection duration calculation portion that calculates a requested fuel injection duration and a fuel injection control portion that causes the in-cylinder injection injector to inject fuel during the compression stroke during the cold start of the engine, and that causes fuel to be injected also in a manner other than the fuel injection performed by the in-cylinder injection injector during the compression stroke if the requested fuel injection duration is longer than or equal to an interval time. Therefore, even if the requested fuel injection duration is longer than or equal to the interval time, the emissions can be reduced while a startability during a cold start of the internal combustion engine is secured.

13 Claims, 11 Drawing Sheets

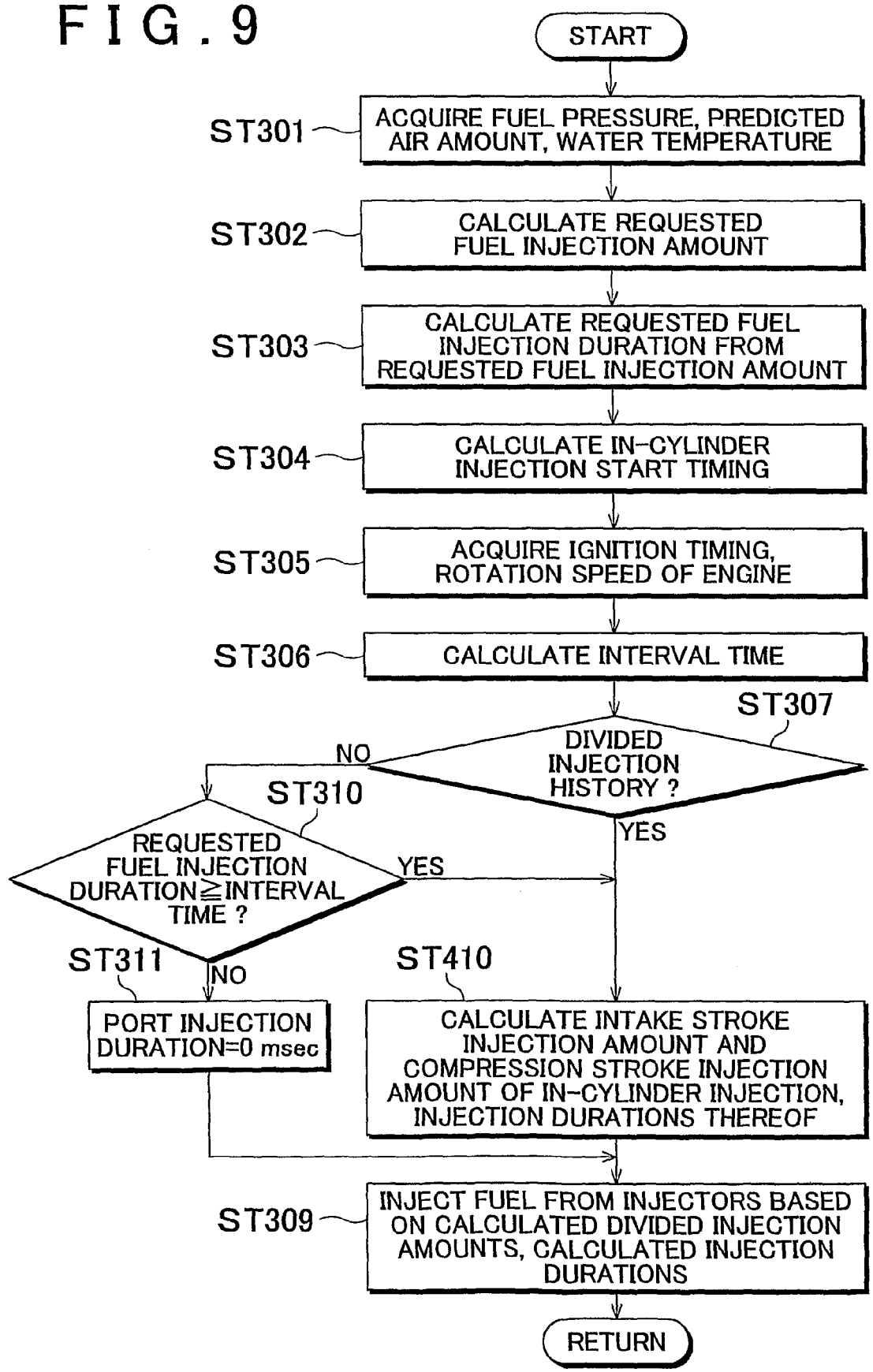

FUEL INJECTION CONTROL DEVICE OF INTERNAL COMBUSTION ENGINE

BACKGROUND OF THE INVENTION

1. Field of the Invention

The invention relates to a fuel injection control device of an internal combustion engine. Particularly, this invention relates to a fuel injection control device of an internal combustion engine that is provided in an internal combustion engine that has a fuel injection devices that supply fuel by the injection to intake ports and the injection into cylinders.

2. Description of the Related Art

An internal combustion engine in the related art is equipped with in-cylinder fuel injection means for injecting fuel directly into cylinders of the internal combustion engine. During operation of the internal combustion engine, fuel is supplied by the in-cylinder fuel injection means. However, during operation of the internal combustion engine, the pressure in each cylinder continues fluctuating. Therefore, in the case where fuel is directly injected into the cylinders, a desired manner of injection of fuel may not be able to be achieved due to the effect of fluctuations in the in-cylinder pressure. For example, in the case where an internal combustion engine is provided with a fuel injection valve that injects fuel into a cylinder, as in-cylinder fuel injection means, the amount of fuel injected from the fuel injection valve into the cylinder may change due to the effect of fluctuations in the in-cylinder pressure.

Concretely, in an internal combustion engine as described above, in which fuel is injected during the intake stroke or the compression stroke, the in-cylinder pressure becomes low during the intake stroke, and becomes high during the compression stroke. Therefore, in the case where fuel is injected to a cylinder at a constant pressure, the amount of fuel injected tends to be larger if fuel is injected during the intake stroke than if fuel is injected during the compression stroke, and thus fuel may not be able to be injected in a desired amount. Hence, there is a possibility that it may become difficult to control the amount of fuel injection with good accuracy, and the fuel economy performance and the exhaust gas purification performance may reduce.

Therefore, in some internal combustion engines in the related art, the effect of fluctuations in the in-cylinder pressure on the amount of fuel injection is reduced. For example, in a fuel control device of an engine described in Japanese Patent Application Publication No. 2001-98973, when fuel is injected during the intake stroke, the duration of the fuel injection by the fuel injection valve is made relatively short during a period from the vicinity of a crank angle at which the descent speed of the piston reaches its maximum until a predetermined crank angle. This restrains excessive increase of the amount of fuel injection in the case where fuel is injected during the intake stroke, during which the in-cylinder pressure becomes low and therefore the amount of fuel injection is likely to become large. As a result, the amount of fuel injection can be controlled. Thus, the fuel economy performance and the exhaust gas purification performance are intended to be improved.

Furthermore, an internal combustion engine in the related art is equipped with in-intake passageway fuel injection means capable of injecting fuel into an intake passageway, and in-cylinder fuel injection means capable of injecting fuel into a cylinder, and thereby injects fuel into both the intake passageway and the cylinder, in order to improve the operation performance of the engine. In such an internal combustion engine, during an ordinary operation, the operation performance is intended to be improved by injecting appropriate amounts of fuel into the intake passageway and the cylinder in accordance with the state of operation. Besides, at the time of the cold start of this internal combustion engine, fuel is injected into the cylinder during the compression stroke so as to achieve an improvement in the startability and a decline in the emissions. That is, at the time of the cold start of the internal combustion engine, a mixture gas of fuel and air is stratified in the cylinder by injecting fuel into the cylinder during the compression stroke, so that the fuel in the mixture gas easily burns, and the startability of the internal combustion engine improves. Besides, since the startability of the internal combustion engine improves, the amount of fuel injection can be considerably reduced, and therefore the amount of HC (hydrocarbon) and CO (carbon monoxide) in exhaust gas can be reduced and the fuel economy can be improved.

However, the amount of fuel injection needed at the time of the cold start tends to be larger the lower the temperature. Therefore, at the time of the cold start, there is a tendency that the lower the temperature of the internal combustion engine or the external air, the larger the amount of fuel injected into the cylinder becomes, and the longer the injection duration becomes. As a result, the duration of the injection of fuel into the cylinder sometimes becomes longer than the time interval from the start timing of the injection of fuel into the cylinder during the compression stroke to the ignition timing. The fuel injection valves that inject fuel into cylinders, that is, injectors that inject fuel, and the like sometimes have variation in the injection characteristic. Furthermore, the fuel pressure that is the pressure of the fuel injected by the injectors also sometimes has some variation. Therefore, in the related-art internal combustion engines, there is a tendency of such variation being taken into account for the injection of fuel. Therefore, the duration of the fuel injection into the cylinder tends to become long due to the variation. This also sometimes results in the duration of the injection of fuel into the cylinder being longer than the time interval from the start timing of the fuel injection into the cylinder during the compression stroke to the ignition timing.

If the duration of the injection of fuel into the cylinder becomes longer than the time interval from the start timing of the fuel injection into the cylinder during the compression stroke to the ignition timing, fuel continues to be injected even after the ignition plug provided for the cylinder ignites. Therefore, there is a possibility of occurrence of irregular combustion or misfire due to a fuel-wet ignition plug. In that case, therefore, a related-art internal combustion engine switches the fuel injection manner from the fuel injection into the cylinder to the fuel injection into the intake passageway, and then injects fuel into the intake passageway during the intake stroke. However, in the case where fuel is injected into the intake passageway at the time of the cold start, the combustion of the fuel in the mixture gas around the ignition plug becomes more difficult than in the case where fuel is injected into the cylinder, and therefore, there is a possibility of decline in the startability. Therefore, there is a need to inject much fuel at the time of starting the engine, which leads to a possibility of deterioration of the emissions.

SUMMARY OF THE INVENTION

It is an object of the invention to provide a fuel injection control device of an internal combustion engine that is capable of reducing the emissions while securing a startability of the internal combustion engine at the time of the cold start.

A fuel injection control device of an internal combustion engine in accordance with a first aspect of the invention includes: an in-cylinder fuel injection device capable of injecting a fuel into a cylinder of the internal combustion engine; an in-intake passageway fuel injection device capable of injecting the fuel into an intake passageway of the internal combustion engine; a fuel injection duration calculation portion that calculates a requested fuel injection duration that is a duration for injecting an amount of fuel needed during a cold start of the internal combustion engine, an in-cylinder fuel injection duration that is a duration for injection of the fuel by the in-cylinder fuel injection device, and an in-intake passageway fuel injection duration that is a duration for injection of the fuel by the in-intake passageway fuel injection device; and a fuel injection control portion that controls the injection of the fuel by the in-cylinder fuel injection device based on the in-cylinder fuel injection duration and controls the injection of the fuel by the in-intake passageway fuel injection device based on the in-intake passageway fuel injection duration, and that causes the in-cylinder fuel injection device to inject the fuel into the cylinder at least during a compression stroke of the cylinder at the time of the cold start of the internal combustion engine, and causes the fuel to be injected also in a manner other than the injection of the fuel performed by the in-cylinder fuel injection device during the compression stroke of the cylinder if the requested fuel injection duration is longer than or equal to a fuel injection-ignition interval time that is an interval between a start timing of the fuel injection by the in-cylinder fuel injection device and an ignition timing of the cylinder.

In this aspect of the invention, at the time of the cold start of the internal combustion engine, fuel is injected into the cylinder by the in-cylinder fuel injection device during the compression stroke of the cylinder. If the requested fuel injection duration is longer than or equal to the fuel injection-ignition interval time, fuel is injected also in a manner other than the fuel injection performed by the in-cylinder fuel injection device during the compression stroke of the cylinder. That is, if the requested fuel injection duration is longer than or equal to the fuel injection-ignition interval time, fuel is injected by the in-cylinder fuel injection device during the compression stroke of the cylinder, and fuel is also injected in a manner other than the injection of fuel performed by the in-cylinder fuel injection device during the compression stroke. Therefore, even if the requested fuel injection duration is longer than or equal to the fuel injection-ignition interval time, an amount of fuel that corresponds to the requested fuel injection duration can be injected. Hence, the amount of fuel needed for the cold start of the internal combustion engine can be injected, and therefore a startability at the time of the cold start can be secured. Besides, since fuel is injected during the compression stroke of the cylinder, the amount of fuel injected can be reduced, and the amounts of HC and CO in exhaust gas can be reduced. As a result, the emissions can be reduced while a startability at the time of the cold start of the internal combustion engine is secured.

In the fuel injection control device of the internal combustion engine in accordance with the foregoing aspect, if the fuel injection control portion causes the fuel to be injected also in the manner other than the injection of the fuel performed by the in-cylinder fuel injection device during the compression stroke of the cylinder, the fuel injection control portion may cause the in-cylinder fuel injection device to inject the fuel during an intake stroke of the cylinder and during the compression stroke of the cylinder.

Furthermore, in the fuel injection control device of the internal combustion engine in accordance with the foregoing aspect, if the fuel injection control portion causes the fuel to be injected also in the manner other than the injection of the fuel performed by the in-cylinder fuel injection device during the compression stroke of the cylinder, the fuel injection control portion may cause the fuel to be injected through a combined use of the in-cylinder fuel injection device and the in-intake passageway fuel injection device.

Still further, in the fuel injection control device of the internal combustion engine in accordance with the foregoing aspect, if the requested fuel injection duration is longer than or equal to the fuel injection-ignition interval time, the fuel injection duration calculation portion may calculate the in-cylinder fuel injection duration using the fuel injection-ignition interval time as an upper limit, and may calculate the in-intake passageway fuel injection duration by subtracting the in-cylinder fuel injection duration from the requested fuel injection duration.

Yet further, in the fuel injection control device of the internal combustion engine in accordance with the foregoing aspect, the in-intake passageway fuel injection device may have a minimum injection duration that is a minimum duration during which the in-intake passageway fuel injection device is able to inject the fuel, and if the in-intake passageway fuel injection duration calculated is less than the minimum injection duration, the fuel injection duration calculation portion may newly calculate the in-intake passageway fuel injection duration by setting it at the minimum injection duration, and may newly calculate the in-cylinder fuel injection duration by subtracting a difference between the in-intake passageway fuel injection duration newly calculated and the in-intake passageway fuel injection duration previously calculated, from the in-intake passageway fuel injection duration previously calculated.

Furthermore, in the fuel injection control device of the internal combustion engine in accordance with the forgoing aspect, the fuel injection duration calculation portion may calculate the requested fuel injection duration before the in-intake passageway fuel injection device injects the fuel, and may calculate the requested fuel injection duration again after the in-intake passageway fuel injection device has started injecting the fuel.

Furthermore, in the fuel injection control device of the internal combustion engine in accordance with the foregoing aspect, if the requested fuel injection duration is calculated again by the fuel injection duration calculation portion after the in-intake passageway fuel injection device has started injecting the fuel is different from the requested fuel injection duration calculated by the fuel injection duration calculation portion before the in-intake passageway fuel injection device has started injecting the fuel, the fuel injection duration calculation portion may increase or decrease the in-cylinder fuel injection duration in accordance with a difference between the two requested fuel injection durations.

Furthermore, in the fuel injection control device of the internal combustion engine in accordance with the foregoing aspect, the fuel injection control portion may advance a timing at which the fuel is injected by the in-cylinder fuel injection device, in a case where the requested fuel injection duration calculated after the in-intake passageway fuel injection device has started injecting the fuel is longer than or equal to the requested fuel injection duration calculated before the in-intake passageway fuel injection device has started injecting the fuel and where the in-cylinder fuel injection duration obtained by adding the difference between the two requested fuel injection durations is longer than or equal to the fuel injection-ignition interval time.

Furthermore, the fuel injection control device of the internal combustion engine in accordance with the foregoing aspect may further include an ignition timing control portion that control the ignition timing, and the ignition timing control portion may retard the ignition timing in the case where the requested fuel injection duration calculated after the in-intake passageway fuel injection device has started injecting the fuel is longer than or equal to the requested fuel injection duration calculated before the in-intake passageway fuel injection device has started injecting the fuel and where the in-cylinder fuel injection duration obtained by adding the difference between the two requested fuel injection durations is longer than or equal to the fuel injection-ignition interval time.

Furthermore, in the fuel injection control device of the internal combustion engine in accordance with the foregoing aspect, if at the time of the cold start of the internal combustion engine, a state occurs in which the fuel is to be injected through the combined use of the in-cylinder fuel injection device and the in-intake passageway fuel injection device, the fuel injection control portion may continue the combined use of the injection of the fuel by the in-cylinder fuel injection device and the injection of the fuel by the in-intake passageway fuel injection device until an operation of the internal combustion engine reaches a stable operation.

The fuel injection control device of the internal combustion engine in accordance with the invention is able to reduce the emissions while securing a startability of the internal combustion engine at the time of the cold start.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 9 is a flowchart showing a processing procedure of a modification of the fuel injection control device of the internal combustion engine in accordance with Embodiment 3 of the invention.

DETAILED DESCRIPTION OF THE EMBODIMENTS

Hereinafter, embodiments of the fuel injection control device of an internal combustion engine of the invention will be described in detail with reference to the drawings. It is to be noted herein that the following embodiments do not limit the invention. Besides, the component elements in the following embodiments include components that are substitutable or easily conceivable by persons of ordinary skill in the art, or that are substantially the same as those in the related art.

Embodiment 1

Figure 1:
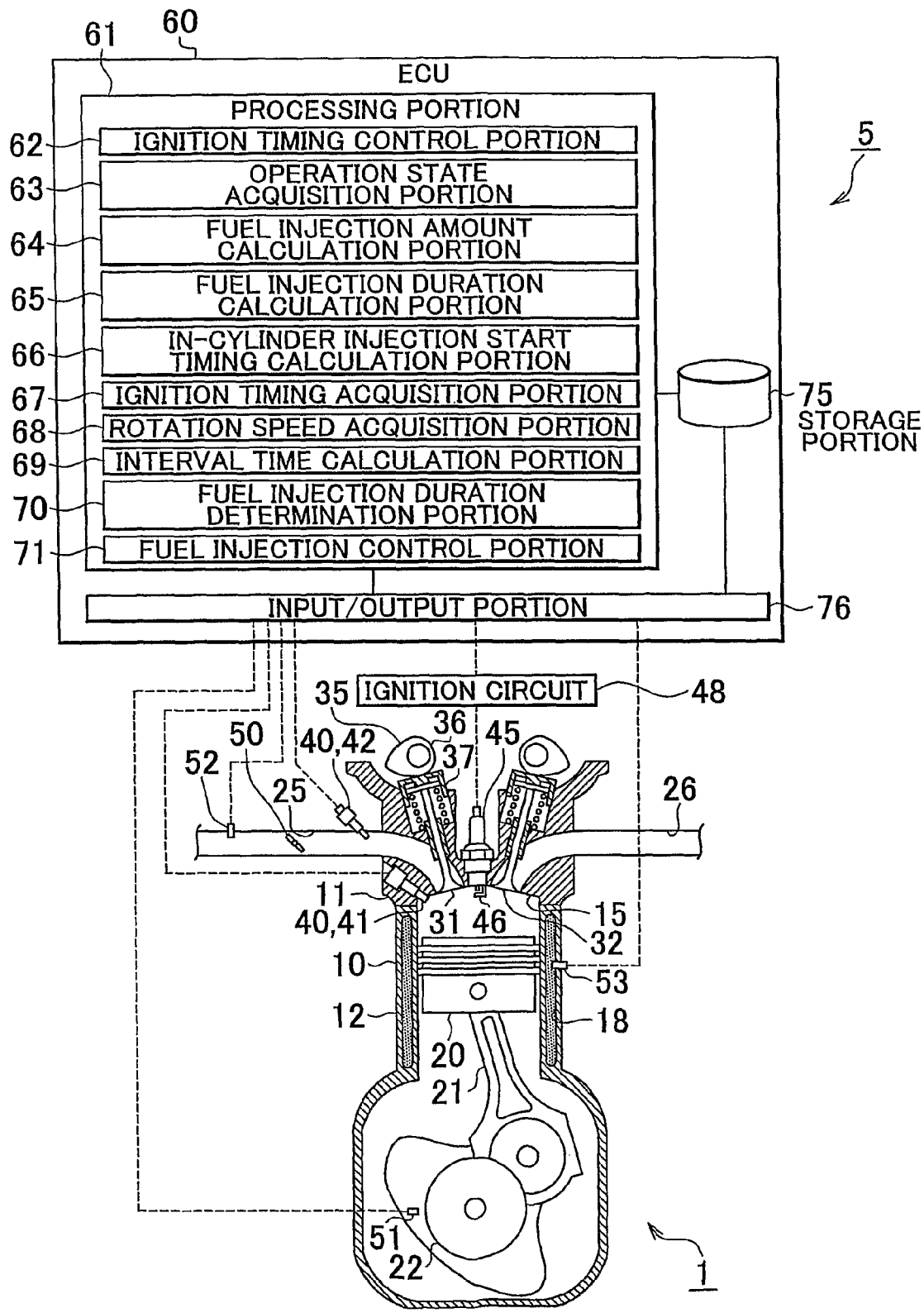
FIG. 1 is a schematic diagram of an internal combustion engine provided with a fuel injection control device of an internal combustion engine in accordance with Embodiment 1 of the invention.

FIG. 1 is a schematic diagram of an internal combustion engine provided with a fuel injection control device of an internal combustion engine in accordance with Embodiment 1 of the invention. An internal combustion engine 1 shown in FIG. 1 has a plurality of cylinders 10. Each cylinder 10 has a cylinder head 11 and a cylinder block 12 that internally define a combustion chamber 15. Since the cylinders 10 have substantially the same construction, the construction of the internal combustion engine 1 will be described mainly on an arbitrary one of the cylinders 10. Inside the cylinder block 12, a piston 20 is provided for reciprocations within the cylinder 10. A crankshaft 22 that is the cranked shaft is provided in a direction passing through the bottom dead center of the piston 20 that is assumed during operation of the internal combustion engine 1. The piston 20 and the crankshaft 22 disposed as described above are connected by a connecting rod 21. Therefore, the crankshaft 22 is provided so as to be rotatable in association with reciprocations of the piston 20.

The cylinder block 12 is provided with a cooling water channel 18 that conveys cooling water that circulates in the internal combustion engine 1 to cool the internal combustion engine 1 during its operation. The cylinder head 11 is fixed, via a gasket (not shown), to end portion of the cylinder block 12 at a side thereof that is in a direction through the top dead center of the piston 20 of the cylinder block 12. Besides, a crank angle detection sensor 51 that detects the crank angle that is the rotational angular position of the crankshaft 22 is provided near the crankshaft 22. Particularly, the crank angle is the rotational angular position of a connecting portion (crank pin) between the connecting rod 21 and the crankshaft 22 in the case where the rotation axis of the crankshaft 22 serves as the center of the rotational angular position.

The cylinder head 11 is provided with an intake valve 31 and an exhaust valve 32, and also with an ignition plug 45. The intake valve 31 the exhaust valve 32 and the ignition plug 45 are provided for each of the cylinders 10. Besides, an intake passageway 25 and an exhaust passageway 26 are connected to the combustion chamber 15. The intake valve 31 is provided on a side of the intake passageway 25, and the exhaust valve 32 is provided on a side of the exhaust passageway 26.

The intake valve 31 and the exhaust valve 32 provided in the cylinder head 11 can be reciprocated by cams 35 each of which is provided at a side of a corresponding one of the intake valve 31 and the exhaust valve 32 that is opposite from the combustion chamber 15. Specifically, the cams 35 are provided on camshafts 36 that are rotated in cooperation with the rotation of the crankshaft 22, and the cams 35 are turned in cooperation with the rotation of the camshafts 36. Furthermore, each of the intake valve 31 and the exhaust valve 32 is provided with a valve spring 37. Each of the intake valve 31 and the exhaust valve 32 is pressed against a corresponding one of the cams 35 by the valve spring 37, so as to be reciprocated as the cams 35 turn.

Of the valves, the intake valve 31 is provided so that it opens and closes the communication between the intake passageway 25 and the combustion chamber 15 as it is reciprocated, and the exhaust valve 32 is provided so that it opens and closes the communication between the exhaust passageway 26 and the combustion chamber 15 as it is reciprocated.

The ignition plug 45 is provided between the intake valve 31 and the exhaust valve 32, and has an ignition portion 46 that produces an electrical discharge when a high voltage is applied thereto. The ignition portion 46 is provided so as to be positioned within the combustion chamber 15. This ignition plug 45 is connected to an ignition circuit 48 that controls the discharge of the ignition portion 46.

The internal combustion engine 1 is provided with two kinds of injectors 40 that are able to supply fuel into the cylinder 10. One of the two kinds of injectors 40 is an in-cylinder injection injector 41 that is an in-cylinder fuel injection device capable of injecting fuel used for the operation of the internal combustion engine 1 into the cylinder 10. The in-cylinder injection injector 41 is provided in the cylinder head 11 so as to be capable of supplying fuel into the cylinder 10 by injecting fuel into the cylinder 10. The other one of the two kinds of injectors 40 is an intake port-injection injector 42 that is an in-intake passageway fuel injection device capable of injecting fuel used for the operation of the internal combustion engine 1 into the intake passageway 25. The intake port-injection injector 42 is provided on the intake passageway 25 so as to be capable of supplying fuel into the cylinder 10 via the intake passageway 25 by injecting fuel into the intake passageway 25.

In the intake passageway 25, a throttle valve 50 capable of opening and closing the intake passageway 25 is provided at an upstream side of a site where the intake port-injection injector 42 is disposed, that is, upstream in the direction of air flowing in the intake passageway 25. Besides, in the intake passageway 25, an air flow meter 52 capable of detecting the amount of air flowing in the intake passageway 25 is provided upstream of the location of the throttle valve 50 in the direction of air flowing in the intake passageway 25. A water temperature sensor 53 capable of detecting the water temperature of cooling water is provided in a path of cooling water circulating in the internal combustion engine 1.

The air flow meter 52, the water temperature sensor 53, the crank angle detection sensor 51, the in-cylinder injection injectors 41, the intake port-injection injectors 42 and the ignition circuit 48 are connected to an ECU (Electronic Control Unit) 60 that controls various portions of a vehicle (not shown) in which the internal combustion engine 1 is mounted.

The ECU 60 is provided with a processing portion 61, a storage portion 75, and an input/output portion 76 which are interconnected so that signals can be passed therebetween. The air flow meter 52 and the like connected to the ECU 60 are connected to the input/output portion 76. The input/output portion 76 inputs and outputs signals from and to these sensors and the like. The storage portion 75 stores a computer program that controls the fuel injection control device 5 of the internal combustion engine 1 in accordance with the invention, that is, stores a computer program that realizes a control method of the fuel injection control device 5 of the internal combustion engine 1 in accordance with the invention. The storage portion 75 can be constructed of a hard disk device, a magneto-optical disk device, a non-volatile memory such as a flash memory or the like (including an only-readable storage medium such as a CD-ROM or the like), or a volatile memory such as a RAM (Random Access Memory), as well as a combination of any of these devices.

The processing portion 61 is constructed of a memory (not shown) and a CPU (Central Processing Unit) (not shown), and has at least an ignition timing control portion 62, an operation state acquisition portion 63, a fuel injection amount calculation portion 64, a fuel injection duration calculation portion 65, an in-cylinder injection start timing calculation portion 66, an ignition timing acquisition portion 67, a rotation speed acquisition portion 68, an interval time calculation portion 69 that is a fuel injection-ignition interval time calculation portion, a fuel injection duration determination portion 70, and a fuel injection control portion 71.

Of these portions, the ignition timing control portion 62 is provided so as to be capable of controlling the ignition timing of the ignition plug 45. The operation state acquisition portion 63 acquires the state of operation of the internal combustion engine 1, such as the fuel pressure, the amount of intake air, the water temperature, etc., during operation of the internal combustion engine 1. The fuel injection amount calculation portion 64 calculates a requested fuel injection amount that is the amount of fuel injection needed at the time of the cold start of the internal combustion engine 1, from the state of operation of the internal combustion engine 1 acquired by the operation state acquisition portion 63. The fuel injection duration calculation portion 65 is capable of calculating a requested fuel injection duration that is the length of time for injecting the amount of fuel needed at the time of the cold start of the internal combustion engine 1, an in-cylinder fuel injection duration that is the length of time for the injection of fuel via the in-cylinder injection injector 41, namely, an in-cylinder injection duration, and an in-intake passageway fuel injection duration that is the length of time for the injection of fuel via the intake port-injection injector 42, namely, a port injection duration. Of these lengths of time, the requested fuel injection duration is calculated from the requested fuel injection amount calculated by the fuel injection amount calculation portion 64.

The in-cylinder injection start timing calculation portion 66 calculates an in-cylinder injection start timing that is the start timing of the fuel injection via the in-cylinder injection injector 41, from the requested fuel injection duration calculated by the fuel injection duration calculation portion 65. The ignition timing acquisition portion 67 acquires the ignition timing of the ignition plug 45 during operation of the internal combustion engine 1. The rotation speed acquisition portion 68 acquires the rotation speed of the internal combustion engine 1 during operation. The interval time calculation portion 69 calculates a fuel injection-ignition interval time that is the interval between the start timing of the fuel injection via the in-cylinder injection injector 41 and the ignition timing of the cylinder 10, namely, an interval time. The fuel injection duration determination portion 70 determines whether the requested fuel injection duration is longer than the interval time.

The fuel injection control portion 71 is capable of controlling the injection of fuel via the in-cylinder injection injector 41 on the basis of the in-cylinder injection duration calculated by the fuel injection duration calculation portion 65, and also controlling the injection fuel via the intake port-injection injector 42 on the basis of the port injection duration calculated by the fuel injection duration calculation portion 65. Besides, at the time of the cold start of the internal combustion engine 1, the fuel injection control portion 71 causes the in-cylinder injection injector 41 to inject fuel into the cylinder 10 at least during the compression stroke thereof. Furthermore, at the time of the cold start of the internal combustion engine 1, if the requested fuel injection duration calculated by the fuel injection duration calculation portion 65 is longer than or equal to the interval time calculated by the interval time calculation portion 69, the fuel injection control portion 71 causes fuel to be injected also in a manner other than the injection of fuel performed via the in-cylinder injection injector 41 during the compression stroke of the cylinder 10.

The in-cylinder injection injector 41, the intake port-injection injector 42 and the like of the fuel injection control device 5 of the internal combustion engine 1 are controlled by the processing portion 61 reading the aforementioned computer program into the built-in memory of the processing portion 61 and performing computation on the basis of results of detection provided by sensors, such as the water temperature sensor 53 and the like, that are provided in various portions of the vehicle, and by the processing portion 61 causing the in-cylinder injection injector 41 and the like to operate in accordance with a result of the computation. At that time, the processing portion 61 stores numerical values being computed into the storage portion 75 or extract numerical values therefrom as appropriate while executing computation. Incidentally, when the fuel injection control device 5 of the internal combustion engine 1 is controlled, a dedicated hardware device that is different from the ECU 60 may be used for the control instead of the aforementioned computer program.

The fuel injection control device 5 of the internal combustion engine 1 in accordance with Embodiment 1 is constructed as described above, and operation and effects thereof will be described below. While the internal combustion engine 1 is being operated, the piston 20 repeatedly reciprocates within the cylinder block 12, thus repeatedly undergoing a cycle of the intake stroke, the compression stroke, the combustion stroke and the exhaust stroke. The reciprocating movement of the piston 20 is transferred to the crankshaft 22 via the connecting rod 21, and the reciprocating movement is converted into rotational movement by the operation of the connecting rod 21 and the crankshaft 22, so that the crankshaft 22 rotates. As the crankshaft 22 rotates, the camshafts 36 rotate in cooperation of the rotation of the crankshaft 22, involving the turning of the cams 35. Therefore, the intake valve 31 and the exhaust valve 32 reciprocate and repeatedly open and close the communication of the combustion chamber 15 with the intake passageway 25 and the exhaust passageway 26, or the communication of the interior of the cylinder 10 with the intake passageway 25 and the exhaust passageway 26.

Thus, during operation of the internal combustion engine 1, the intake valve 31 and the exhaust valve 32 reciprocate, thereby repeatedly opening and closing the communication of the combustion chamber 15 with the intake passageway 25 and the exhaust passageway 26 to allow the intake and exhaust operations. In this manner, the aforementioned fore strokes are cycled. The four strokes will be briefly described. During the intake stroke, fuel is injected from the in-cylinder injection injector 41 and the intake port-injection injector 42 to supply fuel into the cylinder 10. Of these injectors, the intake port-injection injector 42 generates a mixture of fuel and air within the intake passageway 25 by injecting fuel from the intake port-injection injector 42, and thus supplies fuel into the cylinder 10 as the mixture is taken into the cylinder 10 when the intake valve 31 is opened. The in-cylinder injection injector 41 supplies fuel directly into the cylinder 10 by injecting fuel to the air or mixture taken into the cylinder 10 when the intake valve 31 is open. During the compression stroke, both the intake valve 31 and the exhaust valve 32 are closed, and the piston 20 moves in the direction of the top dead center with the valves closed, so that the mixture within the cylinder 10 is compressed.

During the combustion stroke, the compressed mixture is ignited by the ignition circuit 48 applying a high-voltage current to the ignition plug 45 to cause the ignition portion 46 of the ignition plug 45 to generate an arc discharge. Therefore, the fuel in the compressed mixture burns, so that the pressure produced by the combustion moves the piston 20 in the direction of the bottom dead center. As the piston 20 moves, the crankshaft 22 connected to the piston 20 via the connecting rod 21 turns. During the exhaust stroke, the intake valve 31 is closed, and the piston 20 moves in the direction of the top dead center with the exhaust valve 32 open. Therefore, the exhaust gas after the fuel has been burned flows from inside the cylinder 10 toward the exhaust passageway 26, and is thus discharged from the cylinder 10.

Furthermore, at the time of the cold start of the internal combustion engine 1, or during the warmup operation of the internal combustion engine 1, the control is performed differently from that during an ordinary operation that is a state of operation after the warmup operation has been completed. Concretely, at the time of the cold start of the internal combustion engine 1, the operation state acquisition portion 63 of the ECU 60 acquires the state of operation of the internal combustion engine 1, for example, the water temperature of the cooling water or the like, and the fuel injection amount calculation portion 64 of the ECU 60 calculates the requested fuel injection amount that is the amount of fuel needed at the time of the cold start, from the state of operation acquired by the operation state acquisition portion 63. Besides, the fuel injection duration calculation portion 65 of the ECU 60 calculates the requested fuel injection duration from the requested fuel injection amount calculated by the fuel injection amount calculation portion 64.

After that, the in-cylinder injection start timing calculation portion 66 of the ECU 60 calculates the in-cylinder injection start timing from the requested fuel injection duration calculated by the fuel injection duration calculation portion 65. Furthermore, the ignition timing acquisition portion 67 of the ECU 60 acquires the ignition timing of the internal combustion engine 1 during operation, and the rotation speed acquisition portion 68 of the ECU 60 acquires the rotation speed of the internal combustion engine 1. On the basis of the ignition timing and the rotation speed thus acquired and the in-cylinder injection start timing calculated by the in-cylinder injection start timing calculation portion 66, the interval time calculation portion 69 of the ECU 60 calculates the interval time.

The fuel injection duration determination portion 70 of the ECU 60 compares the interval time and the requested fuel injection duration that are calculated as described above, and determines whether the requested fuel injection duration is longer than the interval time. If the result of determination is that the requested fuel injection duration is longer than or equal to the interval time, the fuel injection amount calculation portion 64 calculates divided injection amounts that are to be provided by the in-cylinder injection that is the injection of fuel via the in-cylinder injection injector 41 and the port injection that is the injection of fuel via the intake port-injection injector 42. That is, the fuel injection amount calculation portion 64 calculates the in-cylinder injection amount that is the amount of fuel injection via the in-cylinder injection injector 41 and the port injection amount that is the amount of fuel injection via the intake port-injection injector 42. Thus, the fuel injection amount calculation portion 64 calculates the divided injection amounts for the in-cylinder injection and the port injection. Furthermore, the in-cylinder injection duration and the port injection duration are calculated by the fuel injection duration calculation portion 65 of the ECU 60. On the other hand, if the requested fuel injection duration is shorter than the interval time, the port injection duration is set at 0 msec (0 second).

Incidentally, the in-cylinder injection duration calculated by the fuel injection duration calculation portion 65 is calculated so that the in-cylinder injection duration=a time that is shorter than the interval time. Besides, when the port injection duration is to be calculated by the fuel injection duration calculation portion 65, the port injection duration is calculated as being a duration that allows the intake port-injection injector 42 to inject the port injection amount of fuel that satisfies the following equation: the requested fuel injection amount=the in-cylinder injection amount+the port injection amount. In this manner, when both the in-cylinder injection duration and the port injection duration are to be calculated, the calculation of the in-cylinder injection duration is given priority. Likewise, when both the in-cylinder injection amount and the port injection amount are to be calculated, the calculation of the in-cylinder injection amount is given priority.

The fuel injection control portion 71 of the ECU 60 causes the in-cylinder injection injector 41 and the intake port-injection injector 42 to inject fuel on the basis of the fuel injection amounts and the fuel injection durations calculated as described above. That is, the fuel injection control portion 71 causes the in-cylinder injection injector 41 to inject the divided injection amount for the in-cylinder injection calculated by the fuel injection amount calculation portion 64 by causing the in-cylinder injection injector 41 to inject fuel on the basis of the in-cylinder injection duration calculated by the fuel injection duration calculation portion 65, and causes the intake port-injection injector 42 to inject the divided injection amount for the port injection calculated by the fuel injection amount calculation portion 64 by causing the intake port-injection injector 42 to inject fuel on the basis of the port injection duration calculated by the fuel injection duration calculation portion 65.

Figure 2:
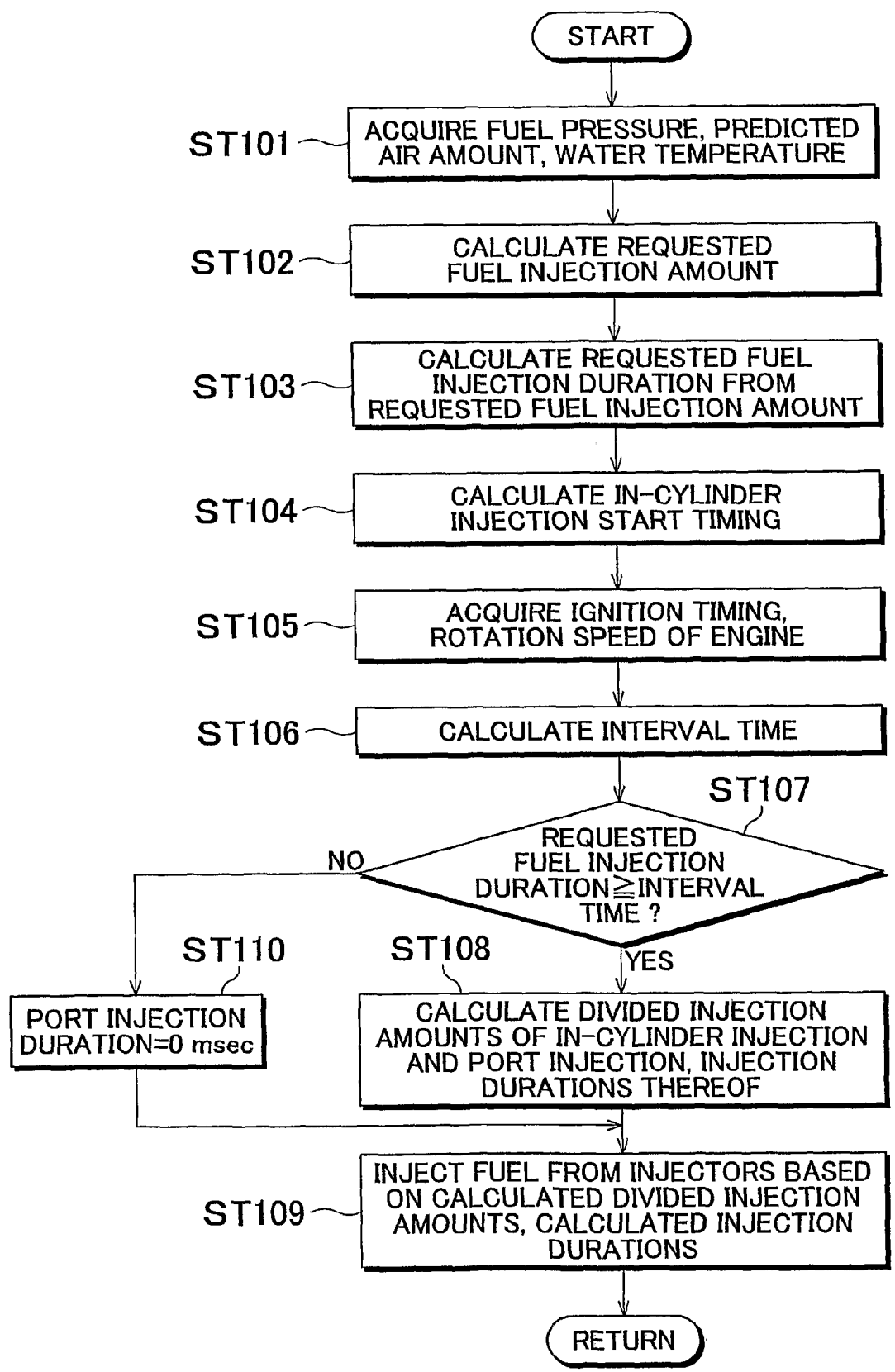
FIG. 2 is a flowchart showing a processing procedure of the fuel injection control device of the internal combustion engine in accordance with Embodiment 1 of the invention.

FIG. 2 is a flowchart showing a processing procedure of the fuel injection control device of an internal combustion engine in accordance with Embodiment 1 of the invention. A control method of the fuel injection control device 5 of the internal combustion engine 1 in accordance with Embodiment 1, that is, the processing procedure of the fuel injection control device 5, will next be described. The processing procedure of the fuel injection control device 5 of the internal combustion engine 1 in accordance with Embodiment 1 is executed at the time of the cold start of the internal combustion engine 1. This processing procedure is executed at a predetermined timing in a stage that is earlier than the timings of injecting fuel from the injectors 40. Specifically, the following processing procedure is executed at a predetermined timing prior to the top dead center of the combustion stroke during which the fuel injected from the injectors 40 is burned; for example, the procedure is executed at the time point of 570° prior to the top dead center.

In this processing procedure, the operation state acquisition portion 63 of the processing portion 61 of the ECU 60 firstly acquires the state of operation of the internal combustion engine 1 (step ST101). Concretely, as the state of operation of the internal combustion engine 1, the operation state acquisition portion 63 of the processing portion 61 of the ECU 60 acquires the fuel pressure of the fuel supplied to each of the in-cylinder injection injector 41 and the intake port-injection injector 42, a predicted amount of air taken into the internal combustion engine 1, and the water temperature of the cooling water circulating through the cooling water channel 18. Of these values, the fuel pressure is detected by a fuel pressure sensor (not shown) that is provided on the path of fuel from a fuel pump (not shown) to the injectors 40, and the fuel pressure used in the other control during operation of the internal combustion engine 1 is acquired by the operation state acquisition portion 63. Furthermore, the predicted air amount is acquired as follows. That is, the amount of air flowing in the intake passageway 25 detected by the air flow meter 52 is acquired by the operation state acquisition portion 63. From this amount of air, the operation state acquisition portion 63 predicts the amount of air that is taken into the cylinder 10 at the timing of the injection of fuel from the injectors 40. The thus-predicted amount of air is acquired as the predicted air amount by the operation state acquisition portion 63. As for the water temperature, the water temperature of the cooling water detected by the water temperature sensor 53 is transferred to the operation state acquisition portion 63, and is thus acquired by the operation state acquisition portion 63.

Next, the requested fuel injection amount is calculated from the state of operation acquired by the operation state acquisition portion 63 (step ST102). Specifically, the state of operation of the internal combustion engine 1 acquired by the operation state acquisition portion 63 is transferred to the fuel injection amount calculation portion 64 of the processing portion 61 of the ECU 60, and the fuel injection amount calculation portion 64 calculates the requested fuel injection amount that is the amount of fuel injection needed for the state of operation.

Next, the requested fuel injection duration is calculated from the requested fuel injection amount calculated by the fuel injection amount calculation portion 64 (step ST103). Specifically, the requested fuel injection amount calculated by the fuel injection amount calculation portion 64 is transferred to the fuel injection duration calculation portion 65 of the processing portion 61 of the ECU 60, and the fuel injection duration calculation portion 65 calculates the requested fuel injection durations that are the lengths of time needed in order to inject the requested fuel injection amounts from the injectors 40.

Next, the in-cylinder injection start timing that is the start timing of the fuel injection via the in-cylinder injection injector 41 is calculated (step ST104). This in-cylinder injection start timing is a start timing of the fuel injection of the in-cylinder injection injector 41 which is calculated so as to be suitable for the warmup operation of the internal combustion engine 1. This in-cylinder injection start timing is calculated from the state of operation of the internal combustion engine 1 acquired by the operation state acquisition portion 63, by the in-cylinder injection start timing calculation portion 66 of the processing portion 61 of the ECU 60. Specifically, the in-cylinder injection start timing is set during the period of the compression stroke of the cylinder 10 provided with the in-cylinder injection injector 41 that starts the fuel injection at the foregoing in-cylinder injection start timing.

Next, the ignition timing and the rotation speed during operation of the internal combustion engine 1 are acquired (step ST105). Of these values, the ignition timing is acquired by the ignition timing acquisition portion 67 as information regarding the ignition timing is transferred from the ignition timing control portion 62 that controls the ignition timing of the ignition plug 45 via the ignition circuit 48, to the ignition timing acquisition portion 67. The rotation speed of the internal combustion engine 1 is acquired as follows. The crank angle of the crankshaft 22 detected by the crank angle detection sensor 51 is transferred to the rotation speed acquisition portion 68 of the processing portion 61 of the ECU 60. From the transferred crank angle, the change in the crank angle during a predetermined time is detected by the rotation speed acquisition portion 68. Then, from the detected change, the rotation speed of the crankshaft 22 is calculated and thus acquired.

Next, the interval time is calculated (step ST106). The interval time is calculated as follows. That is, the in-cylinder injection start timing calculated by the in-cylinder injection start timing calculation portion 66, the ignition timing acquired by the ignition timing acquisition portion 67, and the rotation speed acquired by the rotation speed acquisition portion 68 are transferred to the interval time calculation portion 69 of the processing portion 61 of the ECU 60. Then, the interval time calculation portion 69 calculates the interval time. Specifically, since the interval time is a time interval between the in-cylinder injection start timing and the ignition timing, the interval between the in-cylinder injection start timing and the ignition timing is first calculated in terms of crank angle. Then, from the calculated interval therebetween in crank angle and the acquired rotation speed of the internal combustion engine 1, the length of time that elapses for the calculated interval crank angle in the case of the acquired rotation speed is calculated. This length of time is the time interval between the in-cylinder injection start timing and the ignition timing, that is, the interval time.

Next, it is determined whether the requested fuel injection duration is longer than or equal to the interval time (step ST107). This determination is performed by the fuel injection duration determination portion 70 of the processing portion 61 of the ECU 60. Specifically, the requested fuel injection duration calculated by the fuel injection duration calculation portion 65 and the interval time calculated by the interval time calculation portion 69 are transferred to the fuel injection duration determination portion 70, and the fuel injection duration determination portion 70 determines whether the requested fuel injection duration≧the interval time.

If the fuel injection duration determination portion 70 determines that the requested fuel injection duration is longer than or equal to the interval time, the divided injection amounts for the in-cylinder injection and the port injection, and the injection duration are calculated (step ST108). That is, the fuel injection amount calculation portion 64 calculates the divided injection amounts for the in-cylinder injection and the port injection, and the fuel injection duration calculation portion 65 calculates the in-cylinder injection duration that is the duration of the in-cylinder injection, and the port injection duration that is the duration of the port injection.

It is to be noted herein that since the injectors 40 that inject fuel have individual differences in the fuel injection characteristic, that is, in the characteristic of the amount of fuel that is actually injected in response to a control signal for injecting fuel, and therefore vary in the fuel injection characteristic, there is a need to take into account the amount of variation in the injector characteristic when the fuel injection duration is to be calculated. Furthermore, when the rotation speed of the internal combustion engine 1 is rising, there is a need to take into account the amount of the rise in the rotation speed that occurs from the time of the calculation of the interval time until the time of the actual fuel injection.

Therefore, when the in-cylinder injection duration is to be calculated in the case where the requested fuel injection duration is longer than or equal to the interval time, the injection duration corresponding to the variation in the injector characteristic is subtracted from the interval time. Furthermore, in the case where the rotation speed of the internal combustion engine 1 is rising, the time corresponding to the rise in the rotation speed is subtracted. That is, the in-cylinder injection duration is calculated as follows: the in-cylinder injection duration=the interval time−the time corresponding to the injector characteristic variation−the time corresponding to the rise in the internal combustion engine rotation speed.

The port injection duration is calculated by subtracting the in-cylinder injection duration calculated from the interval time, from the requested fuel injection duration calculated by the fuel injection duration calculation portion 65. That is, the port injection duration is calculated as follows: the port injection duration=the requested fuel injection duration−the in-cylinder injection duration.

Incidentally, in some cases, the injectors 40 may have a minimum injection duration that is the minimum time during which fuel can be injected, and the intake port-injection injector 42 may also have a minimum injection duration. In such a case, for example, if the calculated port injection duration is less than the minimum injection duration of the intake port-injection injector 42, the fuel injection duration calculation portion 65 newly calculates the port injection duration by setting it at a duration equal to the minimum injection duration. In other words, since the intake port-injection injector 42 has a minimum injection duration, the port injection duration is calculated so that the port injection duration ≧ the minimum injection duration. Furthermore, in the case where the port injection duration is newly calculated as described above, the fuel injection duration calculation portion 65 subtracts the difference between the newly calculated port injection duration and the previously calculated port injection duration, from the in-cylinder injection duration, thus newly calculating the in-cylinder injection duration.

Therefore, the fuel injection duration calculation portion 65 calculates the in-cylinder injection duration and the port injection duration, and in association with this, the fuel injection amount calculation portion 64 calculates the in-cylinder injection amount and the port injection amount. Therefore, the fuel injection amount calculation portion 64 calculates the divided injection amounts for the in-cylinder injection and the port injection.

Next, fuel is injected from the injectors 40 on the basis of the divided injection amounts and the injection durations calculated as described above (step ST109). That is, the in-cylinder injection duration and the port injection duration calculated by the fuel injection duration calculation portion 65 are transferred to the fuel injection control portion 71 of the processing portion 61 of the ECU 60, and the fuel injection control portion 71 causes fuel to be injected from the injectors 40 on the basis of the in-cylinder injection duration and the port injection duration transferred thereto. Specifically, when the fuel injection timing is reached, the fuel injection control portion 71 causes fuel to be injected from the in-cylinder injection injector 41 for the in-cylinder injection duration transferred from the fuel injection duration calculation portion 65, and causes fuel to be injected from the intake port-injection injector 42 for the port injection duration transferred from the fuel injection duration calculation portion 65. That is, in the case where the requested fuel injection duration is longer than or equal to the interval time, the fuel injection control portion 71 causes fuel to be injected from both the in-cylinder injection injector 41 and the intake port-injection injector 42. Therefore, in the case where the requested fuel injection duration is longer than or equal to the interval time, the fuel injection control portion 71 causes fuel to be injected also in a manner other than the injection of fuel performed via the in-cylinder injection injector 41 during the compression stroke of the cylinder 10.

Furthermore, in the case where the fuel injection duration determination portion 70 determines that the requested fuel injection duration is not longer than or equal to the interval time, that is, the requested fuel injection duration is less than the interval time, the following setting is made: the port injection duration=0 msec (step ST110). That is, in the case where the requested fuel injection duration is less than the interval time, there is no need to inject fuel from the intake port-injection injector 42, and therefore, the fuel injection amount calculation portion 64 sets the port injection duration, which is the duration of the fuel injection from the intake port-injection injector 42, at 0 msec.

After the port injection duration is set at 0 msec due to the determination made by the fuel injection duration determination portion 70 that the requested fuel injection duration is less than the interval time, fuel is injected from the injectors 40 on the basis of the divided injection amounts and the injection durations that are calculated, as in the case where it is determined that the requested fuel injection duration is longer than or equal to the interval time (step ST109). In this case, since the port injection duration is 0 msec, the fuel injection control portion 71 does not cause fuel to be injected from the intake port-injection injector 42, but causes fuel to be injected only from the in-cylinder injection injector 41 for the in-cylinder injection duration. That is, since the port injection duration is set at 0 msec, the in-cylinder injection duration=the requested fuel injection duration has been brought about, so that the in-cylinder injection amount=the requested fuel injection amount. Therefore, the in-cylinder injection duration and the in-cylinder injection amount are calculated by the fuel injection duration calculation portion 65 and the fuel injection amount calculation portion 64, and then the in-cylinder injection duration and the in-cylinder injection amount are transferred to the fuel injection control portion 71. On the basis of the foregoing values, the fuel injection control portion 71 causes fuel to be injected only from the in-cylinder injection injector 41. Therefore, in the case where it is determined that the requested fuel injection duration is less than the interval time, the fuel injection control portion 71 causes only the in-cylinder injection to be performed.

The fuel injection control device 5 of the internal combustion engine 1 described above injects fuel into the cylinder 10 via the in-cylinder injection injector 41 during the compression stroke of the cylinder 10 at the time of the cold start of the internal combustion engine 1, and injects fuel also in a manner different from the fuel injection performed by the in-cylinder injection injector 41 during the compression stroke of the cylinder 10, in the case where the requested fuel injection duration is longer than or equal to the interval time. For example, in the case where the calculated requested fuel injection duration is long from the beginning, it sometimes happens that the requested fuel injection duration is longer than the interval time. Besides, in the case where the fuel pressure is lower than a target fuel pressure at the time of the cold start of the internal combustion engine 1, the amount of fuel injected from the injectors 40 per unit time is relatively small, so that the requested fuel injection duration sometimes becomes long. In such a case, too, it sometimes happens that the requested fuel injection duration is longer than the interval time. In the case where the rotation speed of the internal combustion engine 1 sharply rises, the interval time becomes relatively short. Therefore, in that case, too, it sometimes happens that the requested fuel injection duration is longer than the interval time.

Thus, in the case where the requested fuel injection duration is longer than or equal to the interval time, fuel is injected via the in-cylinder injection injector 41 during the compression stroke of the cylinder 10, and is also injected in a manner different from the fuel injection performed via the in-cylinder injection injector 41 during the compression stroke. Therefore, even in the case where the requested fuel injection duration is longer than or equal to the interval time, the amount of fuel that corresponds to the requested fuel injection duration can be injected. Hence, since the amount of fuel needed at the time of the cold start of the internal combustion engine 1 can be injected, a startability of the engine at the time of the cold start can be secured. Besides, since fuel is injected during the compression stroke of the cylinder 10, the amount of fuel injected can be reduced, and therefore the amount of HC, CO and the like in exhaust gas can be reduced. As a result, the emissions can be reduced while a startability of the internal combustion engine 1 at the time of the cold start is secured.

Furthermore, in the case where the requested fuel injection duration is longer than or equal to the interval time, the fuel injection control portion 71 causes both the in-cylinder injection injector 41 and the intake port-injection injector 42 to inject fuel. That is, the fuel injection control portion 71 is able to more reliably inject the amount of fuel that corresponds to the requested fuel injection duration by dividing the requested fuel injection duration calculated by the fuel injection duration calculation portion 65 into the in-cylinder injection duration and the port injection duration, and causes the in-cylinder injection injector 41 to inject the amount of fuel that corresponds to the in-cylinder injection duration, and causes the intake port-injection injector 42 to inject the amount of fuel that corresponds to the port injection duration. Therefore, it becomes possible to more reliably inject the amount of fuel needed at the time of the cold start of the internal combustion engine 1 while injecting fuel during the compression stroke of the cylinder 10. As a result, the emissions can be reduced while a startability of the internal combustion engine 1 at the time of the cold start is more reliably secured.

Furthermore, in the case where the in-cylinder injection injector 41 and the intake port-injection injector 42 are provided and fuel is supplied by the in-cylinder injection and/or the port injection, the in-cylinder injection is given priority in the distribution of the amount of fuel between the two manners of injection if the requested fuel injection duration is longer than or equal to the interval time at the time of the cold start of the engine. Therefore, the emissions can be reduced even at the time of low temperature while a degree of stratification of the mixture in the combustion chamber 15 is kept. As a result, the emissions can be reduced while a startability of the internal combustion engine 1 at the time of the cold start is more reliably secured.

Furthermore, in the case there the requested fuel injection duration is longer than or equal to the interval time, the fuel injection duration calculation portion 65 calculates the in-cylinder injection duration, using the interval time as an upper limit. Then, the fuel injection duration calculation portion 65 calculates the port injection duration by subtracting the in-cylinder injection duration from the requested fuel injection duration. Therefore, the in-cylinder injection duration can be kept shorter than or equal to the interval time, and also the requested fuel injection duration can be divided into the in-cylinder injection duration and the port injection duration. Hence, the in-cylinder injection duration can be more reliably kept shorter than or equal to the interval time, and therefore the fuel injection from the in-cylinder injection injector 41 can be finished not later than the ignition timing. Therefore, the poor combustion that occurs due to fuel being injected at the ignition timing can be restrained, and the emissions can be reduced. Besides, since the amount of fuel corresponding to the requested fuel injection duration can be injected from the in-cylinder injection injector 41 and the intake port-injection injector 42, the amount of fuel needed at the time of the cold start of the internal combustion engine 1 can be more reliably injected. As a result of these features, the emissions can be reduced while a startability of the internal combustion engine 1 at the time of the cold start is more reliably secured.

Furthermore, in the case where the calculated port injection duration is less than the minimum injection duration that is a minimum duration during which the intake port-injection injector 42 is able to inject fuel, the fuel injection duration calculation portion 65 newly calculates the port injection duration by setting it at a duration equal to the minimum injection duration. Therefore, when the port injection duration is to be calculated, a duration during which the intake port-injection injector 42 is able to inject fuel can be more reliably calculated, so that an appropriate amount of fuel can be more reliably injected from the intake port-injection injector 42. Furthermore, when the port injection duration has newly been calculated in this manner, the in-cylinder injection duration is also newly calculated by subtracting from the old in-cylinder injection duration a difference between the newly calculated port injection duration and the old port injection duration. Therefore, even in the case where the port injection duration is set at a duration equal to the minimum injection duration of the intake port-injection injector 42, the requested fuel injection duration can be secured. Hence, the amount of fuel needed at the time of the cold start of the internal combustion engine 1 can be more reliably injected. As a result of these features, the emissions can be reduced while a startability of the internal combustion engine 1 at the time of the cold start is more reliably secured.

Furthermore, the fuel injection duration calculation portion 65, when calculating the in-cylinder injection duration, takes into account the characteristics of the fuel injection from the injectors 40, that is, variation in the characteristics of injectors, and subtracts an amount corresponding to the variation from the interval time. Besides, the fuel injection duration calculation portion 65 also subtracts an amount that corresponds to the rise in the rotation speed of the internal combustion engine 1 from the time of calculation of the in-cylinder injection duration and the time of the in-cylinder injection. Therefore, in the case where the requested fuel injection duration is longer than or equal to the interval time, the in-cylinder injection duration can be brought to a maximum duration within the interval time, taking into account the amount that corresponds to the variation in the injector characteristic and the amount that corresponds to the rise in the rotation speed of the internal combustion engine 1. Therefore, a larger amount of fuel can be injected into the cylinder 10 during the compression stroke. Furthermore, the in-cylinder injection can be finished not later than the ignition timing, so that the poor combustion due to fuel being injected at the ignition timing can be restrained. As a result, the emissions can be reduced while a startability of the internal combustion engine 1 at the time of the cold start is more reliably secured.

Embodiment 2

Figure 3:
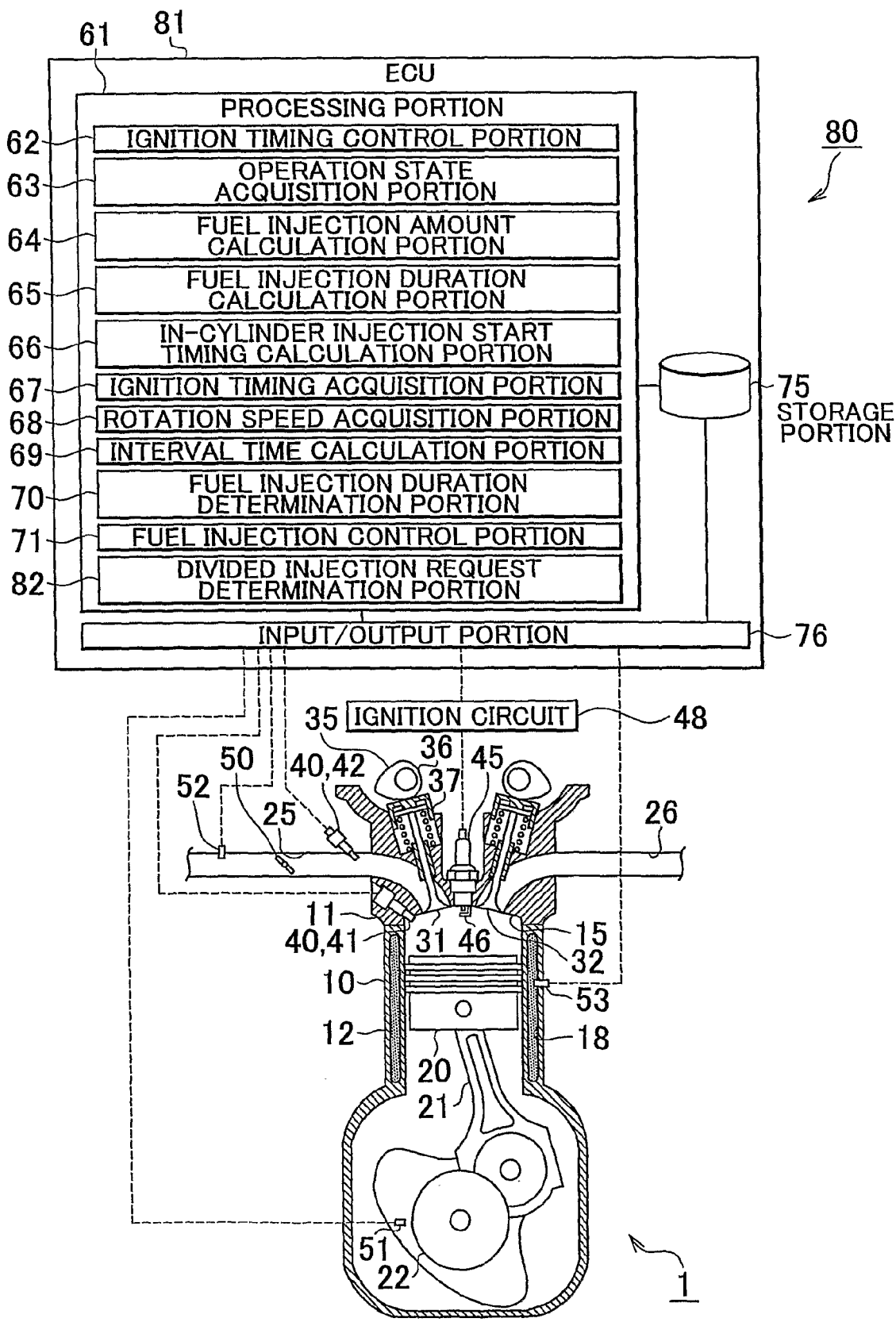
FIG. 3 is a schematic diagram of an internal combustion engine provided with a fuel injection control device of an internal combustion engine in accordance with Embodiment 2 of the invention.

A fuel injection control device 80 of an internal combustion engine 1 in accordance with Embodiment 2 has substantially the same construction as the fuel injection control device 5 of the internal combustion engine 1 in accordance with Embodiment 1, but has a feature in that, with regard to the calculation of the fuel injection durations of the injection of fuel from the injectors 40 and the like, the calculation is performed twice, that is, at a stage well earlier than the fuel injection and a stage immediately prior to the in-cylinder fuel injection. Other constructions are substantially the same as those of Embodiment 1, and therefore will not be described below, and will be suffixed with the same reference numerals. FIG. 3 is a schematic diagram of an internal combustion engine provided with a fuel injection control device of an internal combustion engine in accordance with Embodiment 2 of the invention. In a fuel injection control device 80 of an internal combustion engine 1 shown in FIG. 3, similar to the fuel injection control device 5 of the internal combustion engine 1 in accordance with Embodiment 1, a cylinder head 11 is provided with an in-cylinder injection injector 41, and an intake passageway 25 is provided with an intake port-injection injector 42.

Furthermore, the fuel injection control device 80 of the internal combustion engine 1 in accordance with Embodiment 2, similar to the fuel injection control device 5 of the internal combustion engine 1 in accordance with Embodiment 1, has an ECU 81 that has a processing portion 61, a storage portion 75, and an input/output portion 76. Of these portions, the processing portion 61 has at least an ignition timing control portion 62, an operation state acquisition portion 63, a fuel injection amount calculation portion 64, a fuel injection duration calculation portion 65, an in-cylinder injection start timing calculation portion 66, an ignition timing acquisition portion 67, a rotation speed acquisition portion 68, an interval time calculation portion 69, a fuel injection duration determination portion 70, and a fuel injection control portion 71. Furthermore, the processing portion 61 of the ECU 81 has a divided injection request determination portion 82 that determines whether there is a request for the divided fuel injection using the in-cylinder injection injector 41 and the intake port-injection injector 42 at a predetermined stage.

The fuel injection control device 80 of the internal combustion engine 1 in accordance with Embodiment 2 is constructed as described above, and operations and effects thereof will be described below. During operation of the internal combustion engine 1 equipped with the fuel injection control device 80 of the internal combustion engine 1, the amount of fuel injection from each injector 40 and the injection duration thereof are calculated, and fuel is injected therefrom on the basis of the fuel injection amount and the injection duration. Besides, at the time of the cold start of the internal combustion engine 1, the fuel injection amount and the injection duration suitable for the cold start are calculated. At the time of the cold start, the fuel injection control device 80 of the internal combustion engine 1 in accordance with Embodiment 2 calculates the fuel injection amounts and the injection durations of the injectors 40 at two time points, that is, two time points before the top dead center of the combustion stroke during which the injected fuel is burned, that is, the time point of 570° prior to the ignition top dead center, and the time point of 90° prior to the ignition top dead center.

To calculate the aforementioned values, the state of operation of the internal combustion engine 1 is acquired by the operation state acquisition portion 63 of the ECU 81 at the time point of 570° before the ignition top dead center, and a requested fuel injection amount C that is the amount of fuel needed at the time of the cold start, and the requested fuel injection duration are calculated from the acquired state of operation of the engine 1 by the fuel injection amount calculation portion 64 and the fuel injection duration calculation portion 65 of the ECU 81. After that, the in-cylinder injection start timing calculation portion 66 of the ECU 81 calculates the in-cylinder injection start timing, and the ignition timing acquisition portion 67 and the rotation speed acquisition portion 68 of the ECU 81 acquire the ignition timing and the rotation speed of the internal combustion engine 1 during its operation. On the basis of the in-cylinder injection start timing, the ignition timing and the rotation speed acquired as described above, the interval time calculation portion 69 of the ECU 81 calculates the interval time.

The fuel injection duration determination portion 70 of the ECU 81 determines whether the requested fuel injection duration is longer than the interval time. If the result of the determination is that the requested fuel injection duration is longer than or equal to the interval time, the divided injection amounts of the in-cylinder injection and the port injection, that is, the in-cylinder injection amount A and the port injection amount B, are calculated by the fuel injection amount calculation portion 64. Furthermore, in this case, the in-cylinder injection duration and the port injection duration are calculated by the fuel injection duration calculation portion 65 of the ECU 81. On the other hand, if the requested fuel injection duration is shorter than the interval time, the port injection duration is set at 0 msec.

After that, the aforementioned durations and the like are calculated again immediately prior to the in-cylinder injection during the compression stroke, concretely, at the time point of 90° before the top dead center of the combustion stroke during which the fuel injected from the injectors 40 is burned. That is, the state of operation of the internal combustion engine 1 at the time point of 90° before the ignition top dead center is acquired, and a requested fuel injection amount C' and the requested fuel injection duration are calculated from the acquired state of operation of the engine 1. After that, the in-cylinder injection start timing is calculated, and the ignition timing and the rotation speed are acquired. On the basis of these, the interval time is calculated.

After the interval time is calculated at the time point of 90° before the top dead center, the divided injection request determination portion 82 of the processing portion 61 of the ECU 81 determines whether there was a divided injection request when the amount of fuel injection and the like were calculated at 570° before the top dead center. That is, it is determined whether, at the time point of 570° before the top dead center, the requested fuel injection duration is longer than the interval time and therefore there is a request for the combined use of the in-cylinder injection and the port injection. If it is determined that there is a divided injection request at the time point of 570° before the top dead center, the fuel injection amount calculation portion 64 of the ECU 81 calculates an in-cylinder injection amount A' that is a new in-cylinder injection amount, using the port injection amount B calculated at the time point of 570° before the top dead center. Furthermore, from this in-cylinder injection amount A', a new in-cylinder injection duration is calculated by the fuel injection duration calculation portion 65 of the ECU 81.

On the other hand, if it is determined that there is not a divided injection request at the time point of 570° before the top dead center, it is then determined by the fuel injection duration determination portion 70 of the ECU 81 whether the requested fuel injection duration at the time point of 90° before the top dead center is longer than interval time. If it is determined by the fuel injection duration determination portion 70 that the requested fuel injection duration is longer than the interval time, the calculation is newly performed again by advancing the in-cylinder injection start timing by the amount of time by which the requested fuel injection duration is longer than the interval time. Furthermore, in the case where there is not a divided injection request at the time point of 570° before the top dead center, the port injection duration is set at 0 msec. Therefore, in the case where it is determined that there is not a divided injection request the time point of 570° before the top dead center, the port injection duration is kept at 0 msec. On the basis of the amounts of fuel injection and the injection durations calculated as described above, the fuel injection control portion 71 of the ECU 81 causes the in-cylinder injection injector 41 and the intake port-injection injector 42 to inject fuel.

Figure 4A:
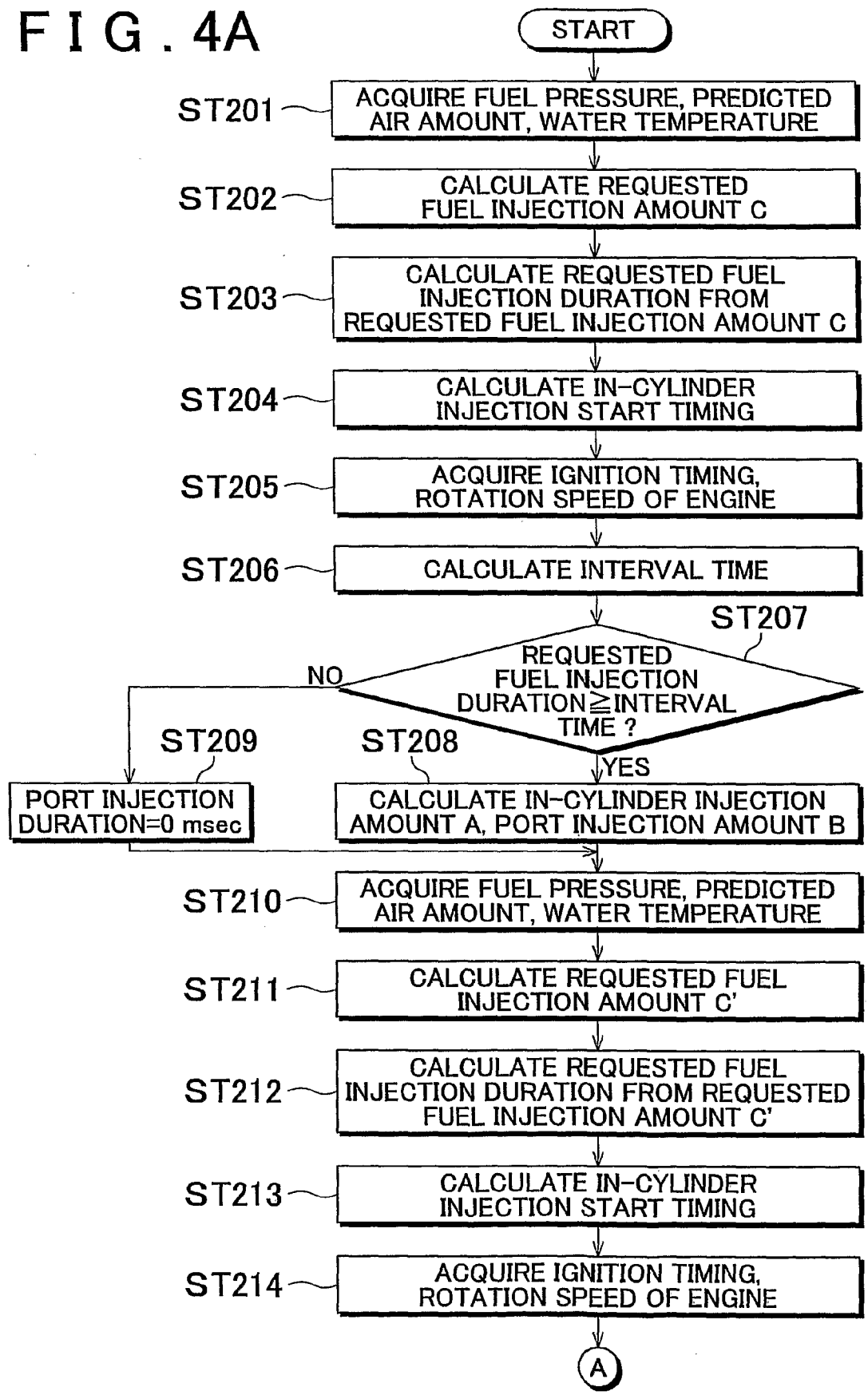
FIGS. 4A and 4B are a flowchart showing a processing procedure of the fuel injection control device of the internal combustion engine in accordance with Embodiment 2 of the invention.
Figure 4B:
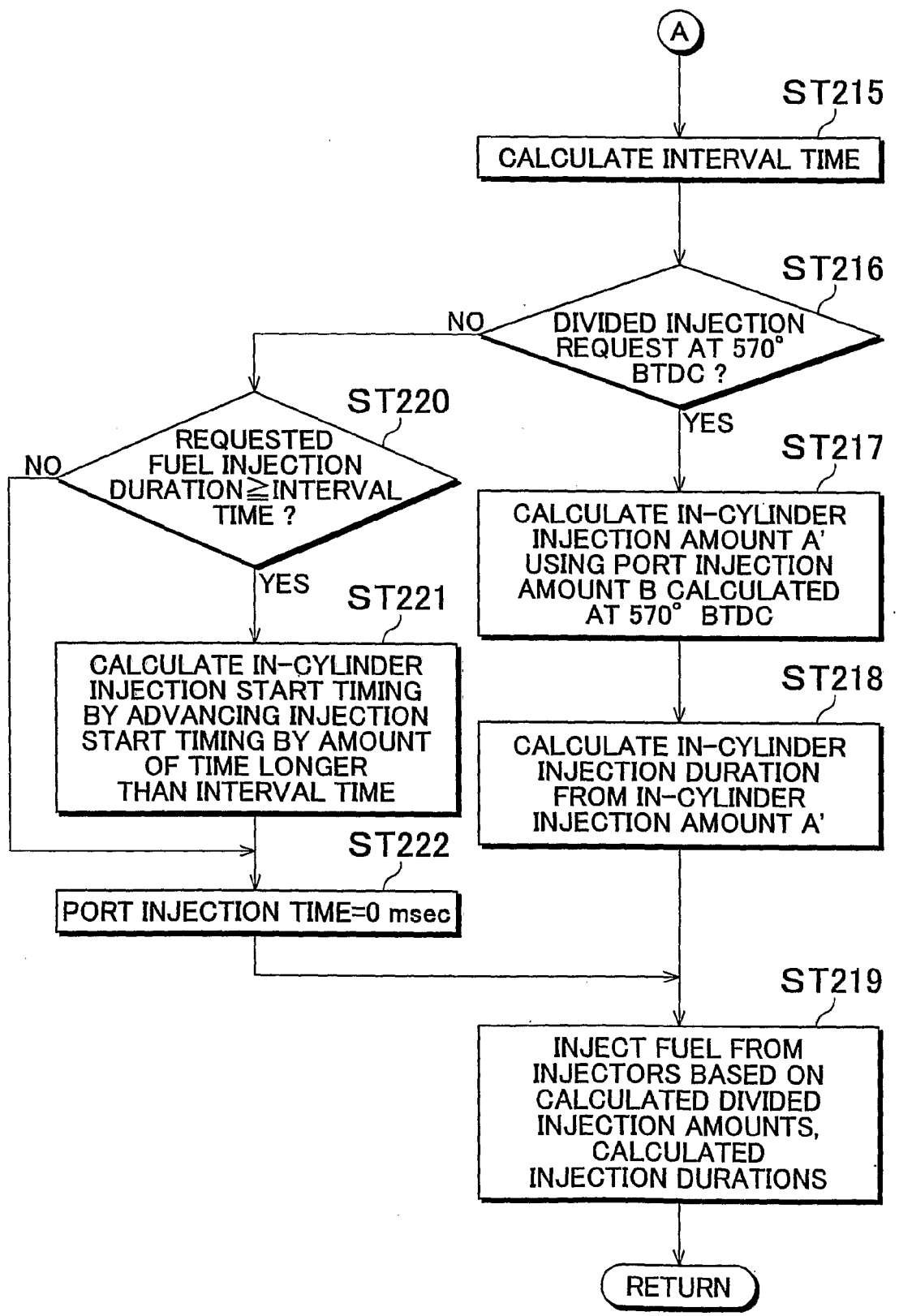

FIGS. 4A and 4B are a flowchart showing a processing procedure of a fuel injection control device of an internal combustion engine in accordance with Embodiment 2 of the invention. A control method of the fuel injection control device 80 of the internal combustion engine 1 in accordance with Embodiment 2, that is, a processing procedure of the fuel injection control device 80, will next be described. The processing procedure of the fuel injection control device 80 of the internal combustion engine 1 in accordance with Embodiment 2 is executed at the time of the cold start of the internal combustion engine 1. In this processing procedure, firstly at the time point of 570° before the top dead center during the combustion stroke during which the fuel injected from the injectors 40 is burned, that is, at 570° BTDC (before the top dead center), the operation state acquisition portion 63 of the ECU 81 acquires the fuel pressure, the predicted air amount and the water temperature as the state of operation of the internal combustion engine 1 (step ST201).

Next, from the state of operation acquired by the operation state acquisition portion 63, the fuel injection amount calculation portion 64 of the ECU 81 calculates the requested fuel injection amount C (step ST202). Next, from the requested fuel injection amount C calculated by the fuel injection amount calculation portion 64, the fuel injection duration calculation portion 65 of the ECU 81 calculates the requested fuel injection duration (step ST203). Next, from the state of operation of the internal combustion engine 1 acquired by the operation state acquisition portion 63, the in-cylinder injection start timing calculation portion 66 of the ECU 81 calculates the in-cylinder injection start timing (step ST204). Incidentally, the in-cylinder injection start timing is within the period of the compression stroke of the cylinder 10 that is provided with the in-cylinder injection injector 41 that starts injecting fuel at this in-cylinder injection start timing.

Next, the ignition timing acquisition portion 67 and the rotation speed acquisition portion 68 of the ECU 81 acquire the ignition timing and the rotation speed of the internal combustion engine 1 during its operation (step ST205). Next, the interval time calculation portion 69 of the ECU 81 calculates the interval time from the in-cylinder injection start timing calculated by the in-cylinder injection start timing calculation portion 66, the ignition timing acquired by the ignition timing acquisition portion 67, and the rotation speed acquired by the rotation speed acquisition portion 68 (step ST206).

Next, the fuel injection duration determination portion 70 of the ECU 81 determines whether the requested fuel injection duration is longer than or equal to the interval time (step ST207). If the fuel injection duration determination portion 70 determines that the requested fuel injection duration is longer than or equal to the interval time, the divided injection amounts of the in-cylinder injection and the port injection and the injection durations thereof are calculated (step ST208). That is, the fuel injection amount calculation portion 64 calculates the in-cylinder injection amount A and the port injection amount B, and the fuel injection duration calculation portion 65 calculates the in-cylinder injection duration and the port injection duration.

On the other hand, if the fuel injection duration determination portion 70 determines that the requested fuel injection duration is less than the interval time, the fuel injection amount calculation portion 64 sets the port injection duration=0 msec (step ST209).

Then, when 90° before the top dead center, that is, the 90° BTDC, of the combustion stroke during which the injected fuel is burned is reached while the internal combustion engine 1 continues operating following the calculation of the amount of fuel injection and the injection duration, the operation state acquisition portion 63 of the ECU 81 newly acquires the fuel pressure, the predicted air amount and the water temperature (step ST210) as the state of operation of the internal combustion engine 1 at the time of 90° BTDC. When the crank angle reaches 90° BTDC while the ECU 81 is performing another process, the then fuel pressure, the then predicted air amount and the then water temperature are acquired by an interrupt.

Next, from the state of operation at 90° BTDC acquired by the operation state acquisition portion 63, the fuel injection amount calculation portion 64 of the ECU 81 calculates the requested fuel injection amount C' (step ST211). Then, from the requested fuel injection amount C', the fuel injection duration calculation portion 65 of the ECU 81 calculates the requested fuel injection duration (step ST212). Next, from the state of operation of the internal combustion engine 1 at 90° BTDC acquired by the operation state acquisition portion 63, the in-cylinder injection start timing calculation portion 66 of the ECU 81 newly calculates the in-cylinder injection start timing (step ST213).

Next, the ignition timing acquisition portion 67 and the rotation speed acquisition portion 68 of the ECU 81 newly acquire the ignition timing and the rotation speed (step ST214). Next, the interval time calculation portion 69 of the ECU 81 newly calculates the interval time from the in-cylinder injection start timing newly calculated by the in-cylinder injection start timing calculation portion 66, the ignition timing newly acquired by the ignition timing acquisition portion 67, and the rotation speed newly acquired by the rotation speed acquisition portion 68 (step ST215).

Next, it is determined whether there is a divided injection request at 570° BTDC (step ST216). Specifically, the divided injection request determination portion 82 of the processing portion 61 of the ECU 81 determines whether, at the time point of 570° BTDC, the requested fuel injection duration is longer than the interval time, and therefore there is a request for the combined use of the in-cylinder injection and the port injection, that is, whether or not the port injection duration=0 msec.

If the divided injection request determination portion 82 determines that there is a divided injection request at the time point of 570° BTDC, the in-cylinder injection amount A' that is a new in-cylinder injection amount is calculated through the use of the port injection amount B calculated at the time point of 570° BTDC (step ST217). It is to be noted herein that at the time point of 90° BTDC, the port injection that is the fuel injection from the intake port-injection injector 42 has already ended. Therefore, to achieve the requested fuel injection amount C' calculated from the state of operation occurring at 90° BTDC, the difference between the amount of fuel injection calculated at 570° BTDC and the amount of fuel injection calculated at 90° BTDC is corrected by the amount of fuel injection from the in-cylinder injection injector 41. That is, since the port injection amount is not changed but only the in-cylinder injection amount is changed from the value calculated at 570° BTDC, the following relationship is established: the requested fuel injection amount C'=the in-cylinder injection amount A'+the port injection amount B. Hence, the in-cylinder injection amount A' that is the new in-cylinder injection amount calculated at 90° BTDC is calculated by the fuel injection duration calculation portion 65 of the ECU 81 as in the in-cylinder injection amount A'=the requested fuel injection amount C'−the port injection amount B.

Next, from the in-cylinder injection amount A' calculated by the fuel injection amount calculation portion 64, the fuel injection duration calculation portion 65 of the ECU 81 calculates the new in-cylinder injection duration that is the duration needed in order to inject the in-cylinder injection amount A' (step ST218). Next, fuel is injected from the injectors 40 on the basis of the calculated divided injection amounts and the calculated injection durations (step ST219). That is, in the case where the in-cylinder injection amount A' and the in-cylinder injection duration are newly calculated, these values are transferred to the fuel injection control portion 71 of the ECU 81, and the fuel injection control portion 71 causes the in-cylinder injection injector 41 to inject fuel on the basis of the in-cylinder injection amount A' and the in-cylinder injection duration.

Furthermore, if the divided injection request determination portion 82 determines that there is not a divided injection request at the time point of 570° BTDC, it is then determined by the fuel injection duration determination portion 70 of the ECU 81 whether the new requested fuel injection duration calculated from the requested fuel injection amount C' is longer than or equal to the interval time (step ST220).

If the fuel injection duration determination portion 70 determines that the new requested fuel injection duration is longer than or equal to the interval time, the in-cylinder injection start timing is newly calculated by advancing the fuel injection start timing by the amount of time by which the requested fuel injection duration is longer than the interval time (step ST221). That is, since the port injection has already ended at the time point of 90° BTDC, the in-cylinder injection duration is made longer than that calculated at the time point of 570° BTDC in order to satisfy the requested fuel injection duration in the case where the requested fuel injection duration newly calculated at the time point of 90° BTDC is longer than or equal to the interval time. It is to be noted herein that the in-cylinder injection is immediately followed by the ignition timing of the ignition plug 45. Therefore, since retardation of the end timing of the in-cylinder injection duration will result in the in-cylinder injection overlapping with the ignition timing, the in-cylinder injection start timing is advanced in order to lengthen the in-cylinder injection duration. Hence, the in-cylinder injection duration is lengthened by the amount of time by which the requested fuel injection duration is longer than the interval time, by advancing the in-cylinder injection start timing. Therefore, when calculating a new in-cylinder injection start timing, the in-cylinder injection start timing calculation portion 66 calculates it by advancing the in-cylinder injection start timing from that calculated at the time point of 570° BTDC by the amount of time by which the requested fuel injection duration is longer than the interval time.

Furthermore, if the divided injection request determination portion 82 determines that there is not a divided injection request at the time point of 570° BTDC, it means that the port injection is not performed, and therefore the fuel injection duration calculation portion 65 maintains the port injection duration=0 msec (step ST222). If the divided injection request determination portion 82 determines that there is not a divided injection request at the time point of 570° BTDC and, furthermore, it is determined that the requested fuel injection duration is less than the interval time, a new in-cylinder injection start timing is not calculated, but the fuel injection duration calculation portion 65 maintains the port injection duration=0 msec (step ST222).

Next, the injectors 40 are caused to inject fuel in the calculated divided injection amounts and for the calculated injection durations (step ST219). That is, in the case where after the divided injection request determination portion 82 determines that there is not a divided injection request at the time point of 570° BTDC, the fuel injection duration determination portion 70 determines that the new requested fuel injection duration is longer than or equal to the interval time, the fuel injection control portion 71 causes the in-cylinder injection injector 41 to start the in-cylinder injection at the newly calculated in-cylinder injection start timing. Besides, in the case where after the divided injection request determination portion 82 has determined that there is not a divided injection request at the time point of 570° BTDC, the fuel injection duration determination portion 70 determines that the new requested fuel injection duration is less than the interval time, the fuel injection control portion 71 causes the in-cylinder injection injector 41 to start the in-cylinder injection at the in-cylinder injection start timing calculated at the time point of 570° BTDC.

Thus, in the fuel injection control device 80 of the internal combustion engine 1, the fuel injection duration calculation portion 65 calculates the requested fuel injection duration at 570° BTDC, and also calculates the requested fuel injection duration at 90° BTDC. That is, the fuel injection duration calculation portion 65 calculate the requested fuel injection duration before the injection from the intake port-injection injector 42, and calculates the requested fuel injection duration again after the injection from the intake port-injection injector 42 has started. Therefore, the accuracy of the requested fuel injection duration for injecting the amount of fuel needed at the time of the cold start of the internal combustion engine 1 can be raised, so that the amount of fuel needed at the time of the cold start of the internal combustion engine 1 can be injected with good accuracy. As a result, the emissions can be reduced while a startability of the internal combustion engine 1 at the time of the cold start is more reliably secured.

Furthermore, in the case where the requested fuel injection duration re-calculated by the fuel injection duration calculation portion 65 after the intake port-injection injector 42 has started injecting fuel is different from the requested fuel injection duration calculated before the start of the fuel injection from the intake port-injection injector 42, the fuel injection duration calculation portion 65 increases or decreases the in-cylinder fuel injection duration in accordance with the difference between the two requested fuel injection durations.

That is, in the case where it is determined that there is a divided injection request at 570° BTDC (step ST216), the in-cylinder injection amount A' is calculated at the time point of 90° BTDC as in the in-cylinder injection amount A'=the requested fuel injection amount C'−the port injection amount B (step ST217), and the new in-cylinder injection duration is calculated from the in-cylinder injection amount A' (step ST218). It is to be noted herein that the relationship between the in-cylinder injection amount A found at the time of calculating the in-cylinder injection duration at the time point of 570° BTDC and the requested fuel injection amount C at the time point of 570° BTDC is the in-cylinder injection amount A=the requested fuel injection amount C−the port injection amount B. Therefore, the in-cylinder injection amount A increases or decreases with an increase or a decrease in the requested fuel injection amount C. Besides, the requested fuel injection duration also increases or decreases in accordance with the requested fuel injection amount. Therefore, in the case where the requested fuel injection duration at the time point of 570° BTDC is different from the requested fuel injection duration at the time point of 90° BTDC, the in-cylinder fuel injection duration is increased or decreased in accordance with the difference between the two requested fuel injection durations.

Furthermore, even in the case where there is not a divided injection request at 570° BTDC, the in-cylinder injection duration is lengthened by advancing the in-cylinder injection start timing in order to satisfy the requested fuel injection duration that is newly calculated at the time point of 90° BTDC (step ST221).

Thus, in the case where the requested fuel injection duration that is re-calculated at the time point of 90° BTDC, that is, after the intake port-injection injector 42 has started injecting fuel (step ST212), is different from the requested fuel injection duration that was calculated at the time point of 570° BTDC, that is, before the start of the fuel injection from the intake port-injection injector 42 (step ST203), the fuel injection duration calculation portion 65 increases or decreases the in-cylinder fuel injection duration in accordance with the difference between the two requested fuel injection durations. Therefore, when the accuracy of the requested fuel injection time is raised by calculating the amount of fuel needed for the cold start of the internal combustion engine 1 before and after the port injection, fuel can be injected more reliably for the calculated requested fuel injection duration. Therefore, the amount of fuel needed at the time of the cold start of the internal combustion engine 1 can be injected with good accuracy. As a result, the emissions can be reduced while a startability of the internal combustion engine 1 at the time of the cold start is more reliably secured.

Furthermore, in the case where the requested fuel injection duration calculated at the time pint of 90° BTDC, that is, after the intake port-injection injector 42 has started fuel injection, is longer than or equal to the requested fuel injection duration calculated at the time point of 570° BTDC, that is, before the fuel injection from the intake port-injection injector 42, and where the in-cylinder fuel injection duration obtained by adding the difference between the two requested fuel injection durations is longer than or equal to the interval time, the fuel injection control portion 71 advances the timing of the injection of fuel from the in-cylinder injection injector 41. That is, in the case where there is not a divided injection request at 570° BTDC and where the requested fuel injection duration newly calculated at 90° BTDC is longer than or equal to the interval time, the difference between the requested fuel injection duration calculated at 570° BTDC and the requested fuel injection duration calculated at 90° BTDC is added to the in-cylinder injection duration by advancing the in-cylinder injection start timing.

Therefore, when the in-cylinder injection duration is lengthened in order to satisfy the requested fuel injection duration newly calculated at time point of 90° BTDC, the in-cylinder injection duration is not lengthened to the finish side, so that adverse effect on the ignition timing following the finish of the in-cylinder injection duration can be restrained. That is, in the case where the in-cylinder injection duration is extended to the finish side and therefore the in-cylinder injection continues even at the ignition timing, there is a possibility of occurrence of a poor combustion. However, since the in-cylinder injection duration is lengthened by advancing the in-cylinder injection start timing, such a poor combustion can be substantially avoided. Hence, when fuel is injected for the requested fuel injection duration whose accuracy has been raised by calculating the amount of fuel needed for the cold start of the internal combustion engine 1 before and after the port injection, the adverse effect on the combustion of fuel can be restrained, and poor combustion can be restrained. As a result, the emissions can be reduced while a startability of the internal combustion engine 1 at the time of the cold start is more reliably secured.

Embodiment 3

Figure 5:
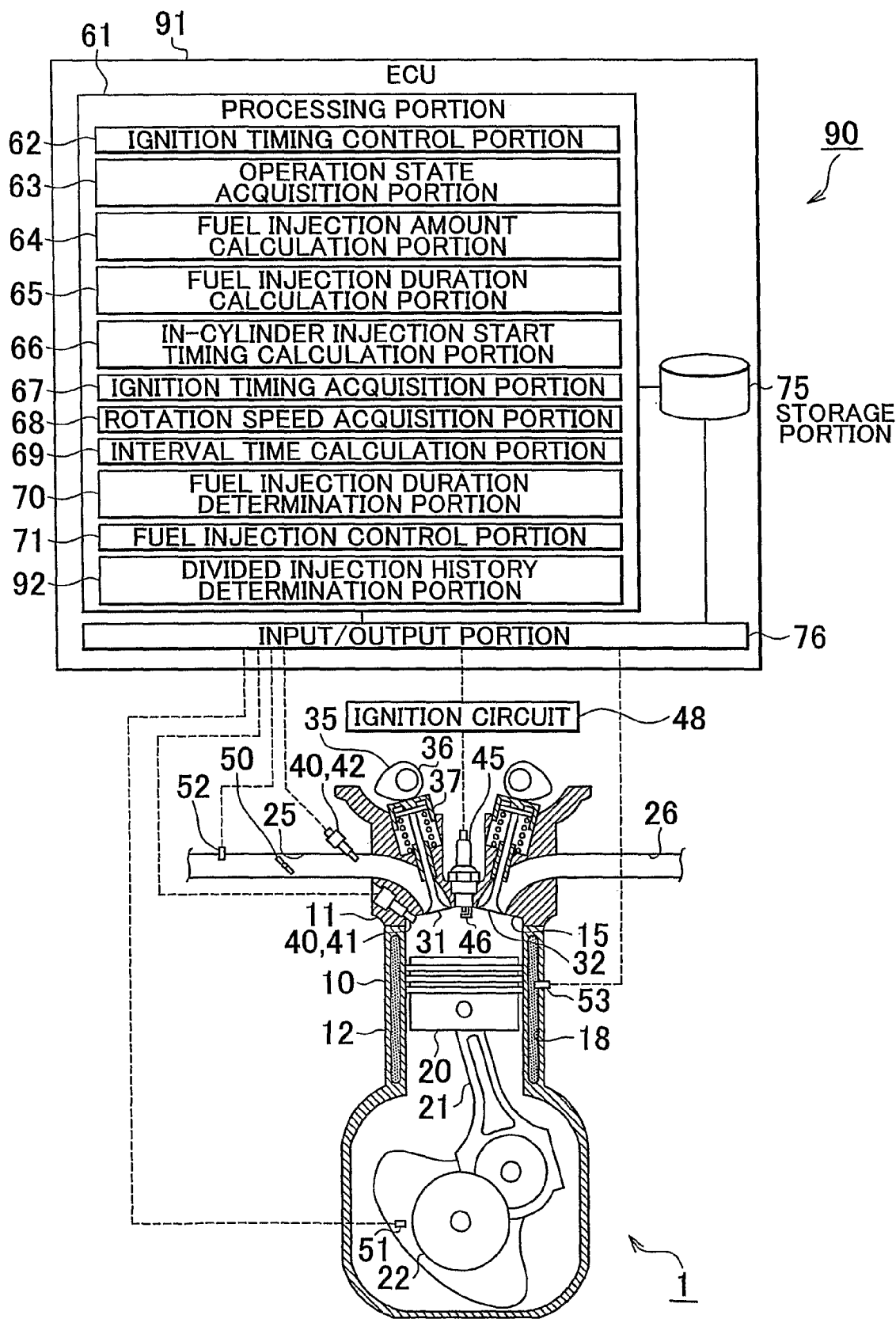
FIG. 5 is a schematic diagram of an internal combustion engine provided with a fuel injection control device of an internal combustion engine in accordance with Embodiment 3 of the invention.

A fuel injection control device 90 of an internal combustion engine 1 in accordance with Embodiment 3 has substantially the same construction as the fuel injection control device 5 of the internal combustion engine 1 in accordance with Embodiment 1, but has a feature in that when the in-cylinder injection and the port injection are used in combination at the time of the cold start of the internal combustion engine 1, the combined use thereof is continued until the operation of the internal combustion engine 1 reaches a stable operation. Other constructions are substantially the same as those of Embodiment 1, and therefore will not be described below, and will be suffixed with the same reference numerals. FIG. 5 is a schematic diagram of an internal combustion engine provided with a fuel injection control device of an internal combustion engine in accordance with Embodiment 3 of the invention. In a fuel injection control device 90 of an internal combustion engine 1 shown in FIG. 5, similar to the fuel injection control device 5 of the internal combustion engine 1 in accordance with Embodiment 1, a cylinder head 11 is provided with an in-cylinder injection injector 41, and an intake passageway 25 is provided with an intake port-injection injector 42.

Furthermore, the fuel injection control device 90 of the internal combustion engine 1 in accordance with Embodiment 3, similar to the fuel injection control device 5 of the internal combustion engine 1 in accordance with Embodiment 1, has an ECU 91 that has a processing portion 61, a storage portion 75, and an input/output portion 76. Of these portions, the processing portion 61 has at least an ignition timing control portion 62, an operation state acquisition portion 63, a fuel injection amount calculation portion 64, a fuel injection duration calculation portion 65, an in-cylinder injection start timing calculation portion 66, an ignition timing acquisition portion 67, a rotation speed acquisition portion 68, an interval time calculation portion 69, a fuel injection duration determination portion 70, and a fuel injection control portion 71. Furthermore, the processing portion 61 of the ECU 91 has a divided injection history determination portion 92 that determines whether there was a divided fuel injection using the in-cylinder injection injector 41 and the intake port-injection injector 42.

The fuel injection control device 90 of the internal combustion engine 1 in accordance with Embodiment 3 is constructed as described above, and operations and effects thereof will be described below. During operation of the internal combustion engine 1 equipped with the fuel injection control device 90 of the internal combustion engine 1, the amount of fuel injection from each injector 40 and the injection duration thereof are calculated, and fuel is injected therefrom on the basis of the fuel injection amount and the injection duration. Besides, at the time of the cold start of the internal combustion engine 1, the fuel injection amounts and the injection durations suitable for the cold start are calculated. At the time of the cold start, the fuel injection amounts and the injection durations are calculated at the time point of 570° prior to the ignition top dead center of the combustion stroke during which the fuel injected from the injectors 40 is burned.

To calculate these values, the state of operation of the internal combustion engine 1 is acquired by the operation state acquisition portion 63 of the ECU 91, and a requested fuel injection amount that is the amount of fuel needed at the time of the cold start, and the requested fuel injection duration are calculated from the acquired state of operation of the engine 1 by the fuel injection amount calculation portion 64 and the fuel injection duration calculation portion 65 of the ECU 91. After that, the in-cylinder injection start timing calculation portion 66 of the ECU 91 calculates the in-cylinder injection start timing, and the ignition timing acquisition portion 67 and the rotation speed acquisition portion 68 of the ECU 91 acquire the ignition timing and the rotation speed of the internal combustion engine 1 during its operation. On the basis of the in-cylinder injection start timing, the ignition timing and the rotation speed acquired as described above, the interval time calculation portion 69 of the ECU 91 calculates the interval time.

After the interval time is calculated, the divided injection history determination portion 92 of the processing portion 61 of the ECU 91 determines whether there was a divided injection performed through the use of the in-cylinder injection injector 41 and the intake port-injection injector 42 after the start of the internal combustion engine 1. If it is determined that there was a divided injection, the divided injection amounts of the in-cylinder injection and the port injection, that is, the in-cylinder injection amount and the port injection amount, are calculated by the fuel injection amount calculation portion 64. Furthermore, in this case, the in-cylinder injection duration and the port injection duration are calculated by the fuel injection duration calculation portion 65 of the ECU 91.

On the other hand, if the divided injection history determination portion 92 determines that there was not a divided injection, the fuel injection duration determination portion 70 of the ECU 91 determines whether the requested fuel injection duration is longer than the interval time. If it is determined by the fuel injection duration determination portion 70 that the requested fuel injection duration is longer than or equal to the interval time, the fuel injection amount calculation portion 64 calculates the in-cylinder injection amount and the port injection amount, and the fuel injection duration calculation portion 65 calculates the in-cylinder injection duration and the port injection duration. Besides, if the fuel injection duration determination portion 70 determines that the requested fuel injection duration is less than the interval time, the fuel injection duration calculation portion 65 sets the port injection duration at 0 msec. After that, the fuel injection control portion 71 of the ECU 91 causes the in-cylinder injection injector 41 and the intake port-injection injector 42 to inject fuel on the basis of the amounts of fuel injection and the injection durations calculated as described above.

Thus, in the case where there was a divided injection, the divided injection amounts of the in-cylinder injection and the port injection were calculated, and fuel was accordingly injected from the in-cylinder injection injector 41 and the intake port-injection injector 42. Therefore, in the case where at the time of the cold start of the internal combustion engine 1, the requested fuel injection duration becomes longer than or equal to the interval time and therefore the in-cylinder injection and the port injection are used in combination, the combined use of the in-cylinder injection and the port injection is continued during a period from a cylinder 10 that follows the cylinder 10 about which the requested fuel injection duration becomes longer than or equal to the interval time for the first time until a fast idle state is reached after the start of the engine, that is, until the operation of the internal combustion engine 1 reaches a stable operation, even if the requested fuel injection duration becomes shorter than the interval time during that period.

For example, in the case where the in-cylinder injection and the port injection come to be used in combination at the first fuel injection operation at the time of the cold start of the internal combustion engine 1, the combined use thereof is continued for the second and subsequent injection operations. In the case where the in-cylinder injection and the port injection come to be used in combination at the third injection operation, the combined use is continued for the fourth and subsequent injection operations. Besides, in the case where the internal combustion engine 1 is a hybrid engine (not shown) connected to an electric motor (not shown), rotation of the internal combustion engine 1 for about two cycles from the first injection during which the rotation of internal combustion engine 1 is unstable is set as being a starting rotation, and the following cycles are set as being a fast idle operation. In the case where the in-cylinder injection and the port injection comes to be used in combination at the time of the cold start of the internal combustion engine 1, the combined use is continued for the aforementioned two cycles.

Figure 6:
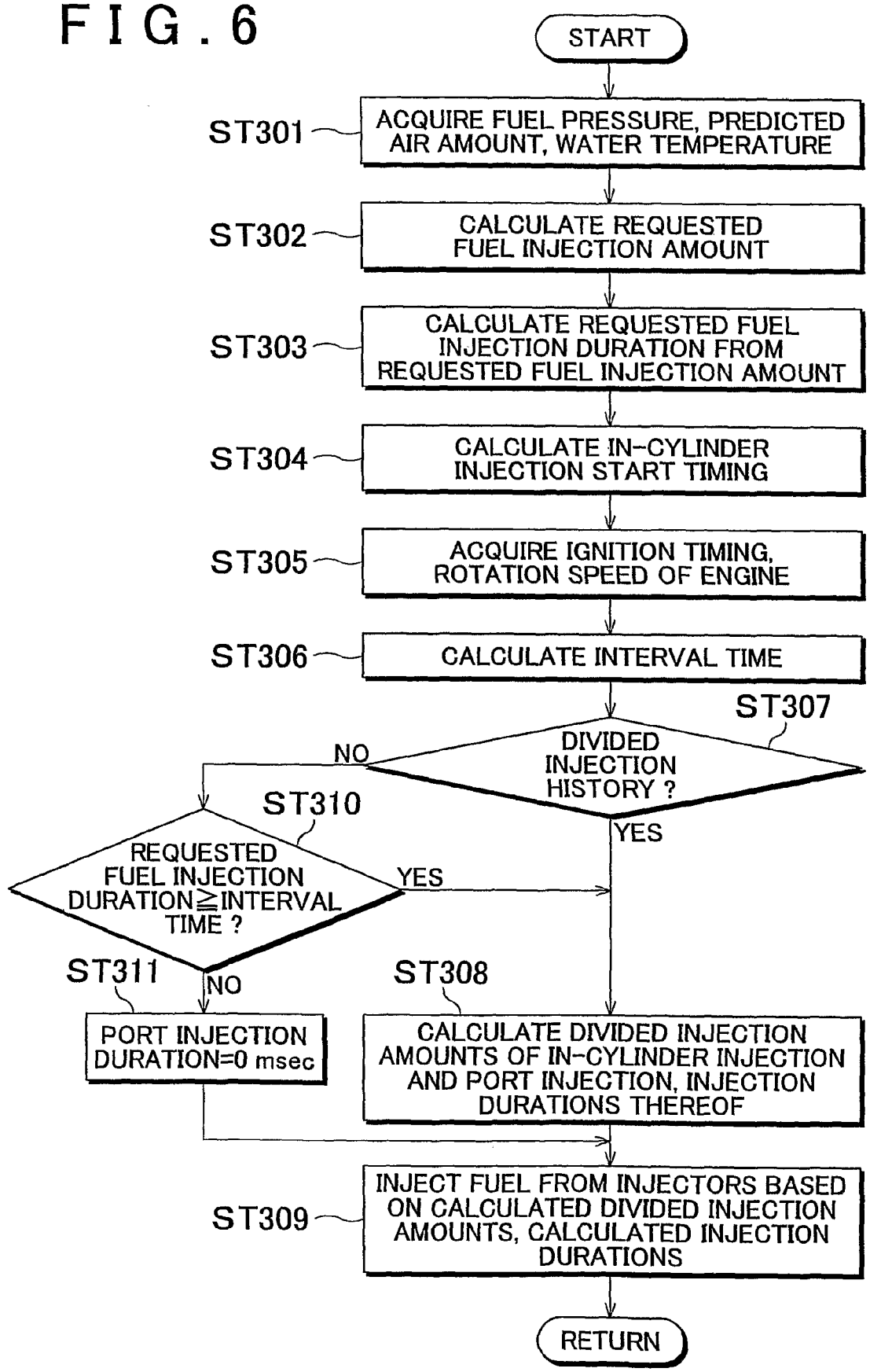
FIG. 6 is a flowchart showing a processing procedure of the fuel injection control device of the internal combustion engine in accordance with Embodiment 3 of the invention.

FIG. 6 is a flowchart showing a processing procedure of a fuel injection control device of an internal combustion engine in accordance with Embodiment 3 of the invention. A control method of the fuel injection control device 90 of the internal combustion engine 1 in accordance with Embodiment 3, that is, a processing procedure of the fuel injection control device 90, will next be described. The processing procedure of the fuel injection control device 90 of the internal combustion engine 1 in accordance with Embodiment 3 is executed at the time of the cold start of the internal combustion engine 1. This processing procedure is executed at a predetermined timing before the top dead center of the combustion stroke during which the fuel injected from the injectors 40 is burned, for example, at the time point of 570° before the top dead center.

In this processing procedure, the operation state acquisition portion 63 of the ECU 91 acquires the fuel pressure, the predicted air amount, and the water temperature as the state of operation of the internal combustion engine 1 (step ST301). Next, from the state of operation acquired by the operation state acquisition portion 63, the fuel injection amount calculation portion 64 of the ECU 91 calculates the requested fuel injection amount (step ST302). Next, from the requested fuel injection amount calculated by the fuel injection amount calculation portion 64, the fuel injection duration calculation portion 65 of the ECU 91 calculates the requested fuel injection duration (step ST303).

Next, from the state of operation of the internal combustion engine 1 acquired by the operation state acquisition portion 63, the in-cylinder injection start timing calculation portion 66 of the ECU 91 calculates the in-cylinder injection start timing (step ST304). Incidentally, the in-cylinder injection start timing calculated in this step is within the period of the compression stroke of the cylinder 10 that is provided with the in-cylinder injection injector 41 that starts the fuel injection at this in-cylinder injection start timing.

Next, the ignition timing acquisition portion 67 and the rotation speed acquisition portion 68 of the ECU 91 acquire the ignition timing and the rotation speed of the internal combustion engine 1 during its operation (step ST305). Next, the interval time calculation portion 69 of the ECU 91 calculates the interval time from the in-cylinder injection start timing calculated by the in-cylinder injection start timing calculation portion 66, the ignition timing acquired by the ignition timing acquisition portion 67, and the rotation speed acquired by the rotation speed acquisition portion 68 (step ST306).

Next, it is determined whether there is a history of divided injection through the in-cylinder injection and the port injection (step ST307). This determination is performed by the divided injection history determination portion 92 of the processing portion 61 of the ECU 91. That is, the divided injection history determination portion 92 determines whether the divided injection of fuel was performed using the in-cylinder injection injector 41 and the intake port-injection injector 42 after the cold start of the internal combustion engine 1.

If the divided injection history determination portion 92 determines that there is a divided injection history, the divided injection amounts of the in-cylinder injection and the port injection, and the injection durations thereof are calculated (step ST308). That is, the fuel injection amount calculation portion 64 calculates the in-cylinder injection amount and the port injection amount, and the fuel injection duration calculation portion 65 calculates the in-cylinder injection duration and the port injection duration.

Next, fuel is injected from the injectors 40 on the basis of the calculated divided injection amounts and the calculated injection durations (step ST319). That is, firstly, the in-cylinder injection amount and the port injection amount calculated by the fuel injection amount calculation portion 64, and the in-cylinder injection duration and the port injection duration calculated by the fuel injection duration calculation portion 65 are transferred to the fuel injection control portion 71 of the ECU 91. The fuel injection control portion 71, to which the aforementioned values has been transferred, causes the in-cylinder injection injector 41 to inject fuel on the basis of the in-cylinder injection amount and the in-cylinder injection duration, and causes the intake port-injection injector 42 to inject fuel on the basis of the port injection amount and the port injection duration.

On the other hand, if the divided injection history determination portion 92 determines that there is not a divided injection history, the fuel injection duration determination portion 70 of the ECU 91 determines whether the requested fuel injection duration is longer than or equal to the interval time (step ST310). If fuel injection duration determination portion 70 determines that the requested fuel injection duration is longer than or equal to the interval time, the process proceeds to step ST308, in which the divided injection amounts of the in-cylinder injection and the port injection, and the injection durations thereof are calculated. Subsequently in step ST309, the fuel injection control portion 71 causes the injectors 40 to inject fuel on the basis of the calculated divided injection amounts and the calculated injection durations.

On the other hand, in the case where the fuel injection duration determination portion 70 determines that the requested fuel injection duration is less than the interval time, the fuel injection duration calculation portion 65 sets the port injection duration=0 msec (step ST311). That is, there being no divided injection history during the cold start of the internal combustion engine 1 means that fuel is being injected only via the in-cylinder injection injector 41. Furthermore, if the requested fuel injection duration is less than the interval time, there is no need to inject fuel from the intake port-injection injector 42. Therefore, in the this case, the fuel injection duration calculation portion 65 sets the port injection duration, which is the fuel injection duration of the intake port-injection injector 42, at 0 msec.

After the setting of the port injection duration=0 msec is made due to the fuel injection duration determination portion 70 determining that the requested fuel injection duration is less than the interval time, the process proceeds to step ST309, in which fuel injection from the injectors 40 is performed on the basis of the calculated divided injection amounts and the calculated injection durations (step ST309). Specifically, since the port injection duration has been set at 0 msec, the in-cylinder injection duration=the requested fuel injection duration, and accordingly the in-cylinder injection amount=the requested fuel injection amount. Therefore, the in-cylinder injection duration and the in-cylinder injection amount are thus calculated by the fuel injection duration calculation portion 65 and the fuel injection amount calculation portion 64, and then are transferred to the fuel injection control portion 71. On the basis of these values transferred, the fuel injection control portion 71 causes only the in-cylinder injection injector 41 to inject fuel.

In the fuel injection control device 90 of the internal combustion engine 1 as described above, in the case where during the cold start of the internal combustion engine 1, a state occurs in which fuel is to injected by using the in-cylinder injection injector 41 and the intake port-injection injector 42 in combination, the fuel injection control portion 71 continues the combined use of the injection of fuel via the in-cylinder injection injector 41 and the injection of fuel via the intake port-injection injector 42 until the operation of the internal combustion engine 1 reaches a stable operation. If the port injection is performed during the cold start, it sometimes happens that a portion of the fuel injected from the intake port-injection injector 42 deposits on a wall or the like of the intake passageway 25 since the temperature of the internal combustion engine 1 is low. Therefore, if during the cold start, the fuel injection is switched between the injection through the combined use of the in-cylinder injection and the port injection and the injection through the in-cylinder injection alone, there is a possibility of deposit of fuel in the intake passageway 25 making it difficult to obtain a desired air-fuel ratio. Besides, the deposit of fuel in the intake passageway 25 may also result in fuel deposit flowing into another cylinder 10, which may also change the air-fuel ratio.

Thus, the switching between the combined use of the in-cylinder injection and the port injection and the single use of the in-cylinder injection during the cold start may considerably degrade the accuracy of the air-fuel ratio. However, if a state occurs in which the in-cylinder injection and the port injection are to be used in combination, the accuracy of the air-fuel ratio can be improved by continuing the combined use of the two manners of injection until the operation of the internal combustion engine 1 reaches a stable operation. Hence, a desired air-fuel ratio can be more reliably obtained, and the deterioration of the emissions caused by deterioration of the air-fuel ratio can be restrained. As a result, a reduction in the emissions can be more reliably made while a startability of the internal combustion engine 1 at the time of the cold start is secured.

Furthermore, in the case where the internal combustion engine 1 equipped with the fuel injection control device 90 is a hybrid engine to which a motor is connected, the requested fuel injection amount is found in terms of the load factor based on the intake air amount since the internal combustion engine 1 is started by injecting fuel from the injectors 40 while the internal combustion engine 1 is being rotated by the motor. Therefore, if the load factor changes during the combined use of the in-cylinder injection and the port injection, the fuel injection mode may switch between the combined use of the in-cylinder injection and the port injection and the single use of the in-cylinder injection for every fuel-injecting operation, and therefore there is a possibility of considerable degradation in the accuracy of the air-fuel ratio.

Hence, if a state in which the in-cylinder injection and the port injection are to be used in combination has occurred in the case where the internal combustion engine 1 is a hybrid engine, the accuracy of the air-fuel ratio in the case where the load factor changes can be improved by continuing the combined use of the in-cylinder injection and the port injection until the operation of the internal combustion engine 1 reaches a stable operation. Therefore, in the case where the internal combustion engine 1 is started by injecting fuel while the internal combustion engine 1 is being rotated by a motor, the degradation in the accuracy of the air-fuel ratio due to changes in the load factor can be restrained, and the deterioration of the emissions caused by the degradation in the accuracy of the air-fuel ratio can be restrained. As a result, a reduction in the emissions can be more reliably made while a startability of the internal combustion engine 1 at the time of the cold start is secured.

Figure 7:
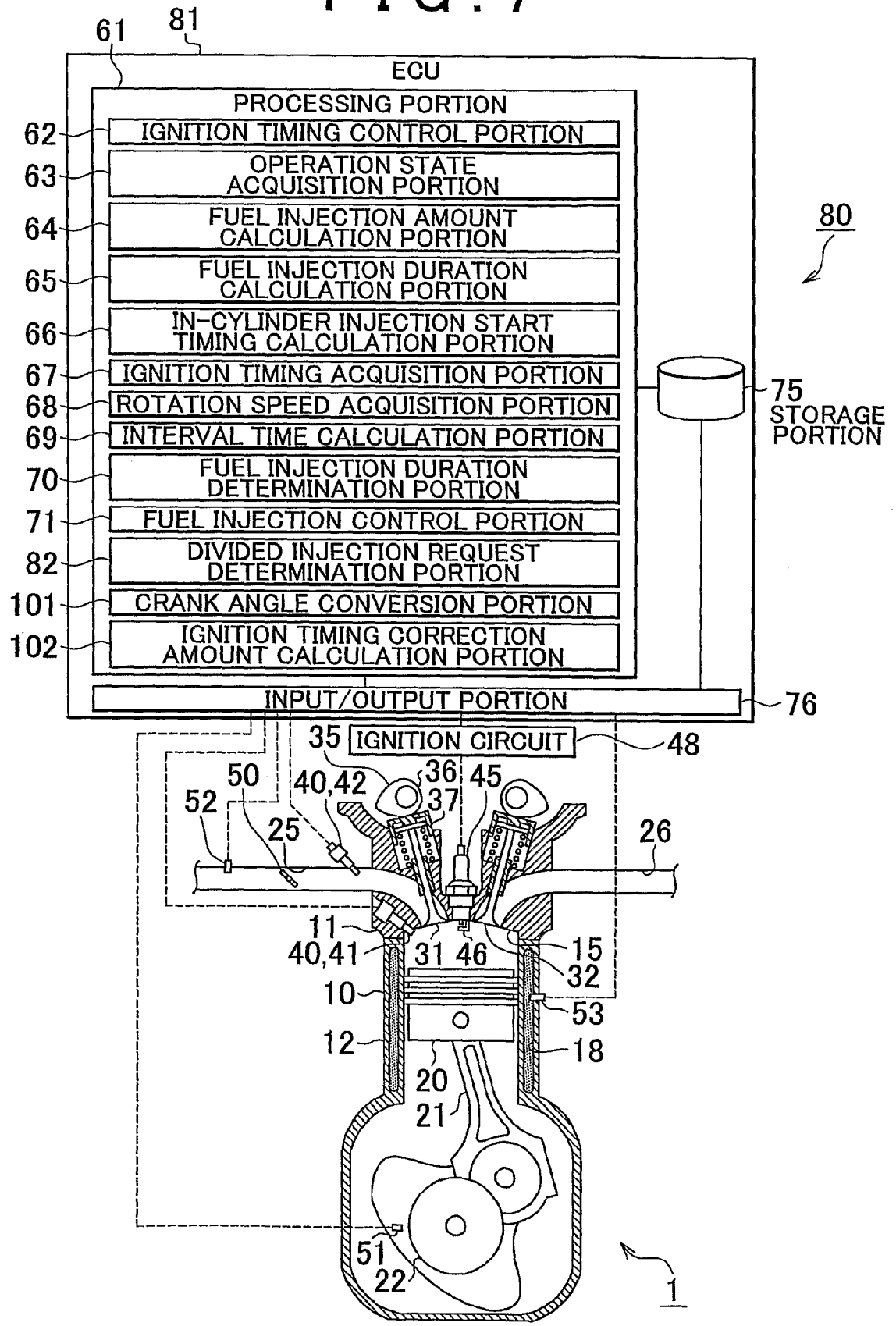
FIG. 7 is a schematic diagram of an internal combustion engine provided with a modification of the fuel injection control device of the internal combustion engine in accordance with Embodiment 2 of the invention.
Figure 8A:
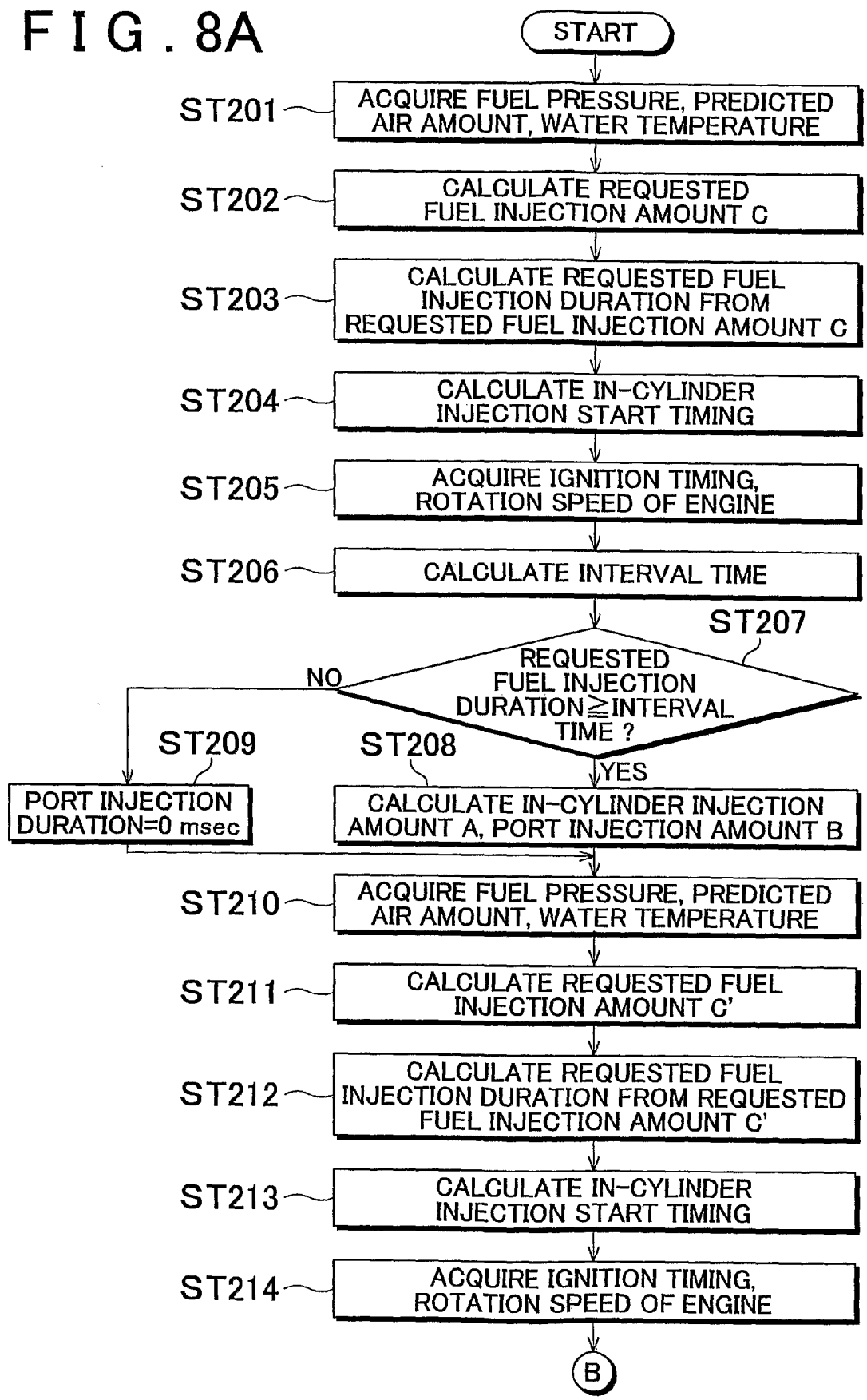
FIGS. 8A and 8B are a flowchart showing a processing procedure of a modification of the fuel injection control device of the internal combustion engine in accordance with Embodiment 2 of the invention.
Figure 8B:
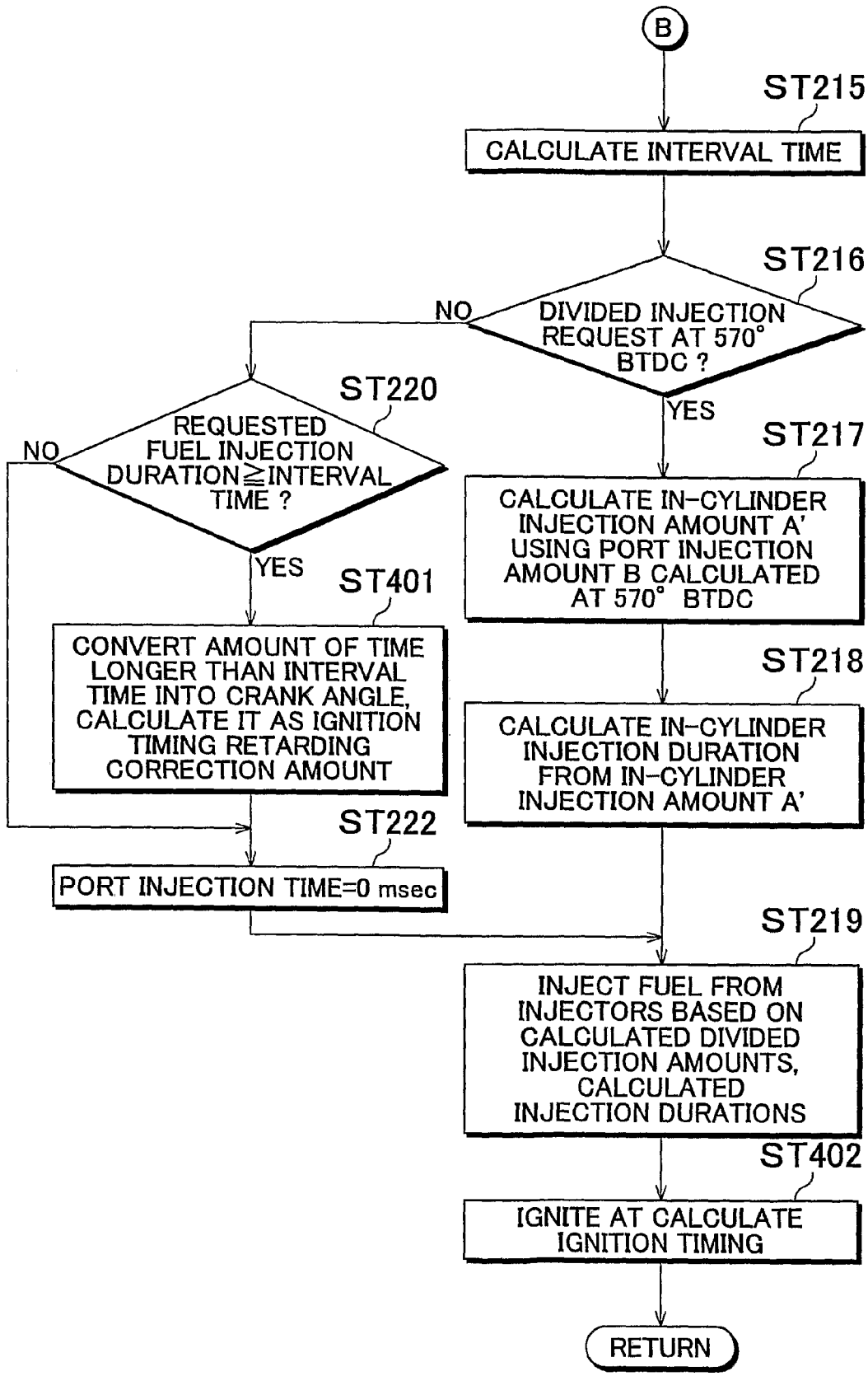

FIG. 7 is a schematic diagram of an internal combustion engine provided with a modification of the fuel injection control device of the internal combustion engine in accordance with Embodiment 2 of the invention. FIGS. 8A and 8B are a flowchart showing a processing procedure in the modification of the injection control device of the internal combustion engine in accordance with Embodiment 2 of the invention. Incidentally, although in the fuel injection control device 80 of the internal combustion engine 1 in accordance with Embodiment 2, the in-cylinder injection start timing is advanced if the requested fuel injection duration newly calculated at 90° BTDC is longer than or equal to the interval time in the case where there is not a divided injection request at 570° BTDC, the ignition timing may be retarded in this case. Concretely, the processing portion 61 of the ECU 81 is provided with a crank angle conversion portion 101 capable of converting the amount of time (excess-interval time) by which the requested fuel injection duration is longer than the interval time into a crank angle based on the then rotation speed, and an ignition timing correction amount calculation portion 102 that calculates an ignition timing retarding correction amount that is the amount by which the ignition timing is retarded for correction, from the crank angle transferred from the crank angle conversion portion 101.

In a processing procedure in the modification of the fuel injection control device 80 of the internal combustion engine 1 in accordance with Embodiment 2, if the fuel injection duration determination portion 70 determines that the new requested fuel injection duration is longer than or equal to the interval time (step ST220) after the divided injection request determination portion 82 determines that there is not a divided injection request at the time point of 570° BTDC (step ST216), the excess-interval time is converted into a crank angle, and is calculated as an ignition timing retarding correction amount (step ST401).

That is, since the port injection has already ended at the time point of 90° BTDC, it is impossible to correct the requested fuel injection duration by adjusting the port injection duration in the case where the requested fuel injection duration newly calculated at the time point of 90° BTDC is longer than or equal to the interval time. Therefore, the interval time is lengthened in order to make the requested fuel injection duration less than the interval time. Since the interval time is an interval between the start timing of the in-cylinder injection and the ignition timing, the ignition timing is retarded when the interval time needs to be lengthened in a manner other than the changing of the in-cylinder injection start timing.

Concretely, the fuel injection duration determination portion 70 of the ECU 81 determines whether the requested fuel injection duration is longer than or equal to the interval time, and if it is determined that the requested fuel injection duration is longer than or equal to the interval time, the excess-interval time is transferred to the crank angle conversion portion 101 of the processing portion 61 of the ECU 81. The crank angle conversion portion 101 converts the excess-interval time transferred thereto into a crank angle based on the then rotation speed, and the crank angle is transferred to the ignition timing correction amount calculation portion 102 of the processing portion 61 of the ECU 81. The ignition timing correction amount calculation portion 102, using the crank angle transferred from the crank angle conversion portion 101, calculates the ignition timing retarding correction amount that is the amount by which the ignition timing is retarded for correction.

The ignition timing retarding correction amount calculated by the ignition timing correction amount calculation portion 102 is transferred to the ignition timing control portion 62 of the processing portion 61 of the ECU 81. The ignition timing control portion 62 causes ignition at the calculated ignition timing (step ST402) after fuel is injected from the injectors 40 (step ST219) on the basis of the divided injection amounts and the injection durations calculated fuel injection amount calculation portion and the fuel injection duration calculation portion.

Specifically, the ignition timing control portion 62 calculates an ignition timing that is suitable to the state of operation of the internal combustion engine 1, and sends a control signal to the ignition circuit 48 on the basis of the calculated ignition timing, so that the ignition circuit 48, in response to the control signal, applies a high-voltage current to the ignition plug 45. Thus, the ignition portion 46 of the ignition plug 45 is caused to generate an arc discharge. That is, the ignition timing control portion 62 controls the ignition of the ignition plug 45 via the ignition circuit 48.

Furthermore, when the ignition timing retarding correction amount calculated by the ignition timing correction amount calculation portion 102 is transferred therefrom to the ignition timing control portion 62, the ignition timing control portion 62 retards the timing of the ignition of the ignition plug 45 in accordance with the ignition timing retarding correction amount. Therefore, the ignition timing is retarded by the amount of time by which the requested fuel injection duration is longer than the interval time, so that the ignition plug 45 ignites after the requested fuel injection duration ends, that is, after the in-cylinder injection duration ends. That is, the interval time, which is the interval from the in-cylinder injection start timing to the ignition timing, becomes longer by an amount that corresponds to the ignition timing retarding correction amount, since the end timing of the interval time becomes later by an amount that corresponds to the ignition timing retarding correction amount.

In other words, the ignition timing control portion 62 retards the ignition timing in the case where the requested fuel injection duration calculated at the time point of 90° BTDC, that is, after the intake port-injection injector 42 has started a fuel injection, is longer than or equal to the requested fuel injection duration calculated at the time point of 570° BTDC, that is, before the fuel injection from the intake port-injection injector 42, and where the in-cylinder fuel injection duration obtained by adding the difference between the aforementioned two requested fuel injection durations is longer than or equal to the interval time.

That is, since step ST401 is performed when there is not a divided injection request at 570° BTDC, there is a relationship of the requested fuel injection duration=the in-cylinder injection duration. Therefore, this in-cylinder injection duration is a duration obtained by adding the difference between the requested fuel injection duration calculated at the time point of 570° BTDC and the requested fuel injection duration calculated at the time point of 90° BTDC to the in-cylinder injection duration calculated at the time point of 570° BTDC.

Hence, the requested fuel injection duration being longer than or equal to the interval time means that the in-cylinder injection duration newly calculated at the time point of 90° BTDC is longer than or equal to the interval time. Therefore, if the in-cylinder injection duration obtained by adding the difference between the requested fuel injection duration calculated at the time point of 570° BTDC and the requested fuel injection duration calculated at the time point of 90° BTDC is longer than or equal to interval time, the ignition timing control portion 62 retards the ignition timing.

Thus, when the in-cylinder injection duration is long, the interval time is made longer by an amount that corresponds to the ignition timing retarding correction amount, and correspondingly, the ignition timing, which is the end timing of the interval time, becomes later. Therefore, the in-cylinder injection duration and the ignition timing do not overlap with each other, so that the poor combustion due to the ignition of the ignition plug 45 occurring during the in-cylinder injection can be restrained. Hence, when fuel is injected on the basis of the requested fuel injection duration whose accuracy has been raised by calculating the amount of fuel needed for the cold start of the internal combustion engine 1 before and after the port injection, the adverse effect on the combustion of fuel can be restrained, and therefore poor combustion can be restrained. As a result, the emissions can be reduced while a startability of the internal combustion engine 1 at the time of the cold start is more reliably secured.

FIG. 9 is a flowchart showing a processing procedure in a modification of the injection control device of the internal combustion engine in accordance with Embodiment 3 of the invention. Although in the fuel injection control device 90 of the internal combustion engine 1 in accordance with Embodiment 3, the in-cylinder injection and the port injection are used in combination in the case where there is a divided injection history or in the case where the newly calculated requested fuel injection duration is longer than or equal to the interval time, the in-cylinder injection may also be performed during the intake stroke and the compression stroke in those cases. For example, in a processing procedure in the modification of the fuel injection control device 90 of the internal combustion engine 1 in accordance with Embodiment 3, in the case where the divided injection history determination portion 92 determines that there is a history of divided injection through the in-cylinder injection and the port injection, or in the case where the fuel injection duration determination portion 70 determines that the requested fuel injection duration is longer than or equal to the interval time, an intake stroke injection amount and a compression stroke injection amount of the in-cylinder injection, and the injection durations thereof are calculated (step ST410).

That is, in the case where it is determined that there is a history of divided injection through the in-cylinder injection and the port injection, or in the case where it is determined that the requested fuel injection duration is longer than or equal to the interval time, the in-cylinder injection is performed through the use of the in-cylinder injection injector 41 during the intake stroke and the compression stroke of the cylinder 10 provided with the in-cylinder injection injector 41. Therefore, in this case, the fuel injection amount calculation portion 64 of the processing portion 61 of the ECU 91 calculates the intake stroke injection amount that is the amount of fuel injection during the intake stroke in the in-cylinder injection, and the compression stroke injection amount of fuel injection during the compression stroke in the in-cylinder injection. Furthermore, the fuel injection duration calculation portion 65 of the processing portion 61 of the ECU 91 calculates the fuel injection durations corresponding to the aforementioned injection amounts.

After that, the calculated values are transferred to the fuel injection control portion 71 of the processing portion 61 of the ECU 91, and fuel is injected from the injectors 40 on the basis of the calculated divided injection amounts and the calculated injection durations. Thus, in the case where fuel is injected also in a manner different from the injection of fuel performed via the in-cylinder injection injector 41 during the compression stroke of the cylinder 10, the fuel injection control portion 71 causes the in-cylinder injection injector 41 to inject fuel during the intake stroke and the compression stroke of the cylinder 10.

As for the injection during the compression stroke and the injection during the intake stroke, the intake stroke injection is performed through the use of the in-cylinder injection injector 41 at 300° BTDC with reference to the ignition top dead center, and the compression stroke injection is performed at 400° BTDC, so as to form a weak stratification in the cylinder 10. Thus, in the case where fuel is injected twice from the in-cylinder injection injector 41, fuel is injected during the intake stroke and during the compression stroke. Since the two fuel injection timings are spaced apart from each other, a time for charging the injector drive unit EDU can be secured. That is, a time for charging the drive unit that operates the injectors 40 can be secured, and the in-cylinder injection can be more reliably performed twice.

Furthermore, if the two injections of fuel from the in-cylinder injection injector 41 can be accomplished by injecting fuel twice during the compression stroke, the formation of a stratified rich mixture and the timing of ignition deviate from each other, so that the flaming characteristic may deteriorate and a problem of combustion deterioration may occur. However, since fuel is injected twice separately during the intake stroke and the compression stroke, a flaming characteristic is secured, and the problem of combustion deterioration can be restrained. As for the priority regarding the amount of injection in the case where fuel is injected twice through the use of the in-cylinder injection injector 41, the first priority is that the amount of the intake stroke injection be larger than or equal to a minimum injection amount of the in-cylinder injection injector 41, and the second priority is that the duration of the compression stroke injection be less than the interval time.

Thus, by accomplishing the fuel injection through the in-cylinder injection alone at the time of the cold start of the internal combustion engine 1, the influence of fuel deposit in the intake passageway 25 can be excluded. Therefore, the accuracy of the air-fuel ratio can be reliably improved, so that the poor combustion can be restrained. As a result, the emissions can be reduced while a startability of the internal combustion engine 1 at the time of the cold start is more reliably secured.

Incidentally, although the foregoing example has been described as a modification of Embodiment 3, this may also be understood as a modification of Embodiment 1. In the fuel injection control device 60 of the internal combustion engine 1 in accordance with Embodiment 1, in the case where the requested fuel injection duration is longer than or equal to the interval time, the in-cylinder injection and the port injection are used in combination. However, instead of using a plurality of kinds of injection devices, it is also permissible to perform the in-cylinder injection during the intake stroke and during the compression stroke. This also achieves substantially the same effects as those described above.

Furthermore, although the fuel injection control device 5 of the internal combustion engine 1 in accordance with Embodiment 1 performs a process of calculating the fuel injection amount and the like at 570° BTDC, the process may also be performed at an angle other than 570° BTDC. It suffices that the process of calculating the fuel injection amount and the like be performed before the port injection starts. Therefore, in the case where the requested fuel injection duration becomes longer than or equal to the interval time during the cold start of the internal combustion engine 1, it is possible to inject the requested fuel injection amount of fuel while making the in-cylinder injection duration shorter than the interval time by performing the port injection. As a result, the emissions can be reduced while a startability of the internal combustion engine 1 at the time of the cold start is more reliably secured.

Furthermore, although in the fuel injection control device 80 of the internal combustion engine 1 in accordance with Embodiment 2, the process of calculating the fuel injection amount and the like is performed at 570° BTDC and 90° BTDC, the process may also be performed at angles other than these angles. As for the process of calculating the fuel injection amount and the like in the fuel injection control device 80 of the internal combustion engine 1 in accordance with Embodiment 2, it suffices that the process be performed at the first time so that at least the calculation is completed before the port injection starts, and that the process be performed at the second time so that at least the calculation is completed before the in-cylinder injection during the compression stroke starts. Therefore, the amount of fuel needed at the time of the cold start of the internal combustion engine 1 can be injected with good accuracy. As a result, the emissions can be reduced while a startability of the internal combustion engine 1 at the time of the cold start is more reliably secured.

Furthermore, in the fuel injection control device 80 of the internal combustion engine 1 in accordance with Embodiment 2, in the case where there is not a divided injection request at 570° BTDC and where the requested fuel injection duration newly calculated at 90° BTDC is longer than or equal to the interval time, the requested fuel injection amount of fuel is injected by advancing the in-cylinder injection start timing. However, the requested fuel injection amount may also be satisfied by increasing the in-cylinder injection amount per unit time. That is, in the case where the requested fuel injection duration newly calculated at 90° BTDC is longer than or equal to the interval time, the requested fuel injection amount C of fuel may be injected by increasing the in-cylinder injection amount through increase of the in-cylinder injection amount per unit time. Therefore, even in the case where the time of the in-cylinder injection is limited, the amount of fuel that corresponds to the requested fuel injection amount C newly calculated at 90° BTDC can be injected. As a result, the emissions can be reduced while a startability of the internal combustion engine 1 at the time of the cold start is more reliably secured.

Incidentally, in the case where the amount of fuel injection and the like are calculated at 570° BTDC and where the in-cylinder injection amount is changed by newly calculating the amount of fuel injection and the like at 90° BTDC, it is preferable that the in-cylinder injection amount calculated at 570° BTDC be calculated with a good margin with respect to the performance of the in-cylinder injection injector 41. Even in the case where the in-cylinder injection amount is newly calculated at 90° BTDC so that the amount of fuel injected via the in-cylinder injection injector 41 is to be increased, the calculation with such a good margin at the time point of 570° BTDC will allow easy adjustment or the like, that is, the increased in-cylinder injection amount of fuel can be more reliably injected via the in-cylinder injection injector 41.

As described above, the fuel injection control device of an internal combustion engine in accordance with the invention is useful for an internal combustion engine that has a plurality of injectors, and in particular, is suitable for an internal combustion engine that performs the compression stroke injection at the time of the cold start of the internal combustion engine.

The invention claimed is:

1. A fuel injection control device of an internal combustion engine, comprising:
   an in-cylinder fuel injection device that injects a fuel into a cylinder of the internal combustion engine;
   an in-intake passageway fuel injection device that injects the fuel into an intake passageway of the internal combustion engine;
   a fuel injection duration calculation portion that calculates a requested fuel injection duration that is a duration for injecting an amount of fuel needed during a cold start of the internal combustion engine, an in-cylinder fuel injection duration that is a duration for injection of the fuel by the in-cylinder fuel injection device, and an in-intake passageway fuel injection duration that is a duration for injection of the fuel by the in-intake passageway fuel injection device; and
   a fuel injection control portion that controls the injection of the fuel by the in-cylinder fuel injection device based on the in-cylinder fuel injection duration and controls the injection of the fuel by the in-intake passageway fuel injection device based on the in-intake passageway fuel injection duration, and that causes the in-cylinder fuel injection device to inject the fuel into the cylinder at least during a compression stroke of the cylinder during the cold start of the internal combustion engine, and causes the fuel to be injected also in a manner other than the injection of the fuel performed by the in-cylinder fuel injection device during the compression stroke of the cylinder if the requested fuel injection duration is longer than or equal to a fuel injection-ignition interval time that is an interval between a start timing of the fuel injection by the in-cylinder fuel injection device and an ignition timing of the cylinder.

2. The fuel injection control device of the internal combustion engine according to claim 1, wherein if the fuel injection control portion causes the fuel to be injected also in the manner other than the injection of the fuel performed by the in-cylinder fuel injection device during the compression stroke of the cylinder, the fuel injection control portion causes the in-cylinder fuel injection device to inject the fuel during an intake stroke of the cylinder and during the compression stroke of the cylinder.

3. The fuel injection control device of the internal combustion engine according to claim 1, wherein if the fuel injection control portion causes the fuel to be injected also in the manner other than the injection of the fuel performed by the in-cylinder fuel injection device during the compression stroke of the cylinder, the fuel injection control portion causes the fuel to be injected through a combined use of the in-cylinder fuel injection device and the in-intake passageway fuel injection device.

4. The fuel injection control device of the internal combustion engine according to claim 3, wherein the fuel injection duration calculation portion calculates the requested fuel injection duration before the in-intake passageway fuel injection device injects the fuel, and calculates the requested fuel injection duration again after the in-intake passageway fuel injection device has started injecting the fuel.

5. The fuel injection control device of the internal combustion engine according to claim 4, wherein if the requested fuel injection duration calculated again by the fuel injection duration calculation portion after the in-intake passageway fuel injection device has started injecting the fuel is different from the requested fuel injection duration calculated by the fuel injection duration calculation portion before the in-intake passageway fuel injection device has started injecting the fuel, the fuel injection duration calculation portion increases or decreases the in-cylinder fuel injection duration in accordance with a difference between the two requested fuel injection durations.

6. The fuel injection control device of the internal combustion engine according to claim 5, wherein the fuel injection control portion advances a timing at which the fuel is injected by the in-cylinder fuel injection device, in a case where the requested fuel injection duration calculated after the in-intake passageway fuel injection device has started injecting the fuel is longer than or equal to the requested fuel injection duration calculated before the in-intake passageway fuel injection device has started injecting the fuel and where the in-cylinder fuel injection duration obtained by adding the difference between the two requested fuel injection durations is longer than or equal to the fuel injection-ignition interval time.

7. The fuel injection control device of the internal combustion engine according to claim 5, further comprising:
   an ignition timing control portion that controls the ignition timing,
   wherein the ignition timing control portion retards the ignition timing in the case where the requested fuel injection duration calculated after the in-intake passageway fuel injection device has started injecting the fuel is longer than or equal to the requested fuel injection duration calculated before the in-intake passageway fuel injection device has started injecting the fuel and where the in-cylinder fuel injection duration obtained by adding the difference between the two requested fuel injection durations is longer than or equal to the fuel injection-ignition interval time.

8. The fuel injection control device of the internal combustion engine according to claim 3, wherein if during the cold start of the internal combustion engine, a state occurs in which the fuel is to be injected through the combined use of the in-cylinder fuel injection device and the in-intake passageway fuel injection device, the fuel injection control portion continues the combined use of the injection of the fuel by the in-cylinder fuel injection device and the injection of the fuel by the in-intake passageway fuel injection device until an operation of the internal combustion engine reaches a stable operation.

9. The fuel injection control device of the internal combustion engine according to claim 3, wherein if the requested fuel injection duration is longer than or equal to the fuel injection-ignition interval time, the fuel injection duration calculation portion calculates the in-cylinder fuel injection duration using the fuel injection-ignition interval time as an upper limit, and calculates the in-intake passageway fuel injection duration by subtracting the in-cylinder fuel injection duration from the requested fuel injection duration.

10. The fuel injection control device of the internal combustion engine according to claim 9, wherein the in-intake passageway fuel injection device has a minimum injection duration that is a minimum duration during which the in-intake passageway fuel injection device is able to inject the fuel, and wherein if the in-intake passageway fuel injection duration calculated is less than the minimum injection duration, the fuel injection duration calculation portion newly calculates the in-intake passageway fuel injection duration by setting the in-intake passageway fuel injection duration at a duration equal to the minimum injection duration, and newly calculates the in-cylinder fuel injection duration by subtracting a difference between the in-intake passageway fuel injection duration newly calculated and the in-intake passageway fuel injection duration previously calculated, from the in-intake passageway fuel injection duration previously calculated.

11. The fuel injection control device of the internal combustion engine according to claim 1, wherein if the requested fuel injection duration is longer than or equal to the fuel injection-ignition interval time, the fuel injection duration calculation portion calculates the in-cylinder fuel injection duration using the fuel injection-ignition interval time as an upper limit, and calculates the in-intake passageway fuel injection duration by subtracting the in-cylinder fuel injection duration from the requested fuel injection duration.

12. The fuel injection control device of the internal combustion engine according to claim 11, wherein the in-intake passageway fuel injection device has a minimum injection duration that is a minimum duration during which the in-intake passageway fuel injection device is able to inject the fuel, and wherein if the in-intake passageway fuel injection duration calculated is less than the minimum injection duration, the fuel injection duration calculation portion newly calculates the in-intake passageway fuel injection duration by setting the in-intake passageway fuel injection duration at a duration equal to the minimum injection duration, and newly calculates the in-cylinder fuel injection duration by subtracting a difference between the in-intake passageway fuel injection duration newly calculated and the in-intake passageway fuel injection duration previously calculated, from the in-intake passageway fuel injection duration previously calculated.

13. A fuel injection control method for an internal combustion engine equipped with an in-cylinder fuel injection device that injects fuel into a cylinder and an in-intake passageway fuel injection device that injects fuel into an intake passageway, comprising:

calculating a requested fuel injection duration that is a duration for injecting a needed amount of fuel, and a start timing of the fuel injection by the in-cylinder fuel injection device based on a state of operation of the internal combustion engine during a cold start of the internal combustion engine;

calculating a fuel injection-ignition interval time that is an interval between the start timing of the fuel injection by the in-cylinder fuel injection device and an ignition timing of the cylinder based on a rotation speed of the internal combustion engine, the ignition timing of the cylinder, and the start timing of the fuel injection by the in-cylinder fuel injection device;

determining whether the requested fuel injection duration is longer than or equal to the fuel injection-ignition interval time;

calculating an in-intake passageway fuel injection duration that is a duration for injection of the fuel by the in-intake passageway fuel injection device by subtracting the fuel injection-ignition interval time from the requested fuel injection duration if the requested fuel injection duration is longer than or equal to the fuel injection-ignition interval time;

controlling an in-cylinder fuel injection duration that is a duration for injection of the fuel by the in-cylinder fuel injection device so that the in-cylinder fuel injection duration becomes less than or equal to the fuel injection-ignition interval time; and controlling the in-intake passageway fuel injection duration so that the in-intake passageway fuel injection duration becomes equal to the injection duration calculated.

\* \* \* \* \*